(12) United States Patent
Uomori et al.

(10) Patent No.: US 6,268,880 B1
(45) Date of Patent: Jul. 31, 2001

(54) STEREOSCOPIC CG IMAGE GENERATING APPARATUS AND STEREOSCOPIC TV APPARATUS

(75) Inventors: Kenya Uomori; Masamichi Nakagawa, both of Hirakata; Atsushi Morimura, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/668,092

(22) Filed: Sep. 22, 2000

Related U.S. Application Data

(62) Division of application No. 09/447,638, filed on Nov. 23, 1999, now Pat. No. 6,175,379, which is a division of application No. 08/669,768, filed on Jun. 27, 1996, now Pat. No. 6,005,607.

(30) Foreign Application Priority Data

| Jun. 29, 1995 | (JP) | 7-163361 |
| Aug. 24, 1995 | (JP) | 7-215841 |
| Nov. 8, 1995 | (JP) | 7-289495 |
| Jan. 19, 1996 | (JP) | 8-007209 |

(51) Int. Cl.$^7$ ................................... H04N 13/02
(52) U.S. Cl. ............................. 348/47; 345/425
(58) Field of Search ................ 348/42, 43, 47; 345/425; H04N 13/02

(56) References Cited

U.S. PATENT DOCUMENTS

| 3,674,921 | 7/1972 | Goldsmith . | |
| 4,647,965 | 3/1987 | Imsand . | |
| 4,656,506 | * 4/1987 | Ritchey | 348/39 |
| 4,743,965 | 5/1988 | Yamada et al. . | |
| 4,751,570 | 6/1988 | Robinson . | |
| 4,819,064 | 4/1989 | Diner . | |
| 4,825,393 | 4/1989 | Nishiya . | |
| 4,881,122 | 11/1989 | Murakami . | |

(List continued on next page.)

FOREIGN PATENT DOCUMENTS

| 0 328 357 | 8/1989 | (EP) . |
| 0 583 060 | 2/1994 | (EP) . |
| 0 607 000 | 7/1994 | (EP) . |
| 0 641 132 | 3/1995 | (EP) . |

Primary Examiner—Howard Britton
(74) Attorney, Agent, or Firm—Ratner & Prestia

(57) ABSTRACT

The stereoscopic CG image generating apparatus and a stereoscopic TV apparatus, has a projection transformation section which, based on three-dimensional structural information describing a three-dimensional shape of an object, generates a plurality of two-dimensional projection models as viewed from a plurality of viewpoints, a distance information extraction section which generates a camera-to-object distance information used for calculations in the projection transformation section, and a camera parameter determining section which, based on the output of the distance information extraction section, the screen size of a stereoscopic image display device for displaying finally generated two-dimensional projection models, and a viewer's viewing distance, determines camera parameters so that stereoscopic CG images will be brought within the viewer's binocular fusional range. According to the thus constructed stereoscopic CG image generating apparatus and stereoscopic TV apparatus, proper camera parameters (focal length or field of view, camera spacing, and converging point) are determined based on the camera-to-object distance information, the magnitude of parallax of the generated stereoscopic CG images on the display device (or in a window on the display screen), and the viewing distance, so that easy-to-view stereoscopic CG images are automatically generated regardless of the display size, and by horizontally translating left-eye and right-eye images, binocular parallax of displayed images is automatically brought within the viewer's binocular fusional range regardless of the size of a stereoscopic display used.

8 Claims, 22 Drawing Sheets

U.S. PATENT DOCUMENTS

| | | |
|---|---|---|
| 4,905,081 | 2/1990 | Morton et al. . |
| 5,012,351 | 4/1991 | Isono et al. . |
| 5,130,794 * | 7/1992 | Ritchey ................................. 348/39 |
| 5,142,642 | 8/1992 | Sudo . |
| 5,253,302 | 10/1993 | Massen . |
| 5,315,377 | 5/1994 | Isono et al. . |
| 5,416,510 | 5/1995 | Lipton et al. . |
| 5,495,576 * | 2/1996 | Ritchey ................................. 395/125 |
| 5,767,898 | 6/1998 | Urano et al. . |
| 5,946,424 | 8/1999 | Oshima . |
| 6,005,607 * | 12/1999 | Uomori et al. ........................ 348/42 |
| 6,175,379 * | 1/2001 | Uomori et al. ........................ 348/47 |

* cited by examiner

| EDGE NUMBER | START POINT, END POINT |
|---|---|
| L1 | V1, V4 |
| L2 | V4, V3 |
| --- | --- |
| L12 | V7, V3 |

| FACE NUMBER | VERTEX NUMBER | FACE COLOR |
|---|---|---|
| F1 | V1, V5, V8, V4 | R1, G1, B1 |
| F2 | V5, V6, V7, V8 | R2, G2, B2 |
| --- | --- | --- |
| F6 | V6, V5, V1, V2 | R6, G6, B6 |

| VERTEX | COORDINATES |
|---|---|
| V1 | $(x_1, y_1, z_1)$ |
| V2 | $(x_2, y_2, z_2)$ |
| --- | --- |
| V8 | $(x_8, y_8, z_8)$ |

DATA STRUCTURE OF GEOMETRIC MODEL

GEOMETRIC MODEL OF POLYHEDRON

STEREOSCOPIC CG IMAGE GENERATING APPARATUS AND STEREOSCOPIC TV APPARATUS

This application is a division of U.S. patent application Ser. No. 09/447,638 filed Nov. 23, 1999, now U.S. Pat. No. 6,175,379, which is a division of U.S. patent application Ser. No. 08/669,768 filed Jun. 27, 1996, now U.S. Pat. No. 6,005,607.

BACKGROUND OF THE INVENTION

1. Field of the Invention

The present invention relates to a stereoscopic CG image generating apparatus for making stereoscopic vision possible by stereoscopically displaying two-dimensional images generated from three-dimensional structural information, and also relates to a stereoscopic TV apparatus for displaying a stereoscopic image.

2. Related Art of the Invention

An example of a prior art stereoscopic image generating apparatus is shown in FIG. 10. According to this apparatus, three-dimensional structural information, describing a three-dimensional shape of an object by a surface model, is input (the object is approximated by a plurality of small surfaces called polygons, and the structural information defines the three-dimensional positions of the vertices of each polygon and the faces and edges formed by the polygons), and the object defined by this information is arranged in a world coordinate system. Then, projection transformation sections 1 and 2 calculate the two-dimensional positions of the object that would be projected on a film when photographed by an imaginary camera, and rendering sections 3 and 4 determine the brightness and color (e.g., R, G, B values) of an image within each polygon on the basis of the material of the object, the type of the light source used, and the three-dimensional positions.

For example, a geometric model of a polyhedron, such as the one shown in FIG. 11($a$), is described by the three-dimensional coordinates of vertices V1 to V8 and the data structure (forming faces and edges) of the geometric model, as shown in FIG. 11($b$), and the object described by this information is arranged in the world coordinate system as shown in FIG. 12($a$). Then, an image (vertices) of the object projected on a screen 50, as viewed from viewpoint E of the camera, is calculated. Next, the positions on the screen of the faces and edges formed by the vertices and their brightness and color are calculated to produce an image for output. At this time, in order to produce a stereoscopic image, images as viewed from at least two viewpoints need to be calculated; therefore, camera parameters must be specified as shown in FIG. 12($b$), that is, 2Wc which is the spacing between a plurality of cameras, CL and CR which are the positions of the camera viewpoints, P which is the three-dimensional coordinates of the converging point of the cameras, and f which is the focal length of the cameras (or θ which is the field of view).

FIG. 18 shows an example of a prior art stereoscopic TV apparatus for displaying a stereoscopic image.

This apparatus comprises two CRTs with crossed polarizing filters attached to their respective display surfaces, and a half-silvered mirror is used to combine the two display images. When viewed by a viewer wearing glasses constructed from corresponding polarizing filters, the images are shown to the viewer's left eye and right eye, respectively.

However, in the above prior art stereoscopic CG generating apparatus, the plurality of camera parameters have to be changed according to the viewing distance and screen size, but in actuality, these parameters are adjusted by a CG operator, based on his experience, by viewing the generated stereoscopic CG images and setting the parameters so that an easy-to-view image can be presented to the viewer. There is therefore the problem that if stereoscopic CG images generated with improperly adjusted parameters are displayed on a stereoscopic image display device, the binocular parallax of the stereoscopic images (expressing, for example, the difference between the horizontal positions of the same vertices in the left and right images in terms of view angle) often exceeds the allowable range of the viewer, resulting in unnatural stereoscopic images that tend to increase eye strain.

In view of the above problem of the prior art stereoscopic CG image generating apparatus, it is an object of the present invention to provide a stereoscopic image generating apparatus that can automatically generate natural and easy-to-view stereoscopic images for a viewer regardless of the viewing distance and screen size.

In the case of the prior art stereoscopic TV apparatus, when the same stereoscopic image signal is input, if the screen size is different, the binocular parallax of displayed images is also different. FIG. 19 explains this; that is, binocular parallax As on a small display screen (a) increases to ΔL on a large display screen (b). If this binocular parallax becomes too large, the viewer will have difficulty in achieving stereoscopic vision, thus increasing eye strain.

Difficulty in achieving stereoscopic vision means that, if binocular parallax ΔN becomes large, and the distance between the image display screen and point P where the object is perceived for stereoscopic viewing increases, as shown in FIG. 20($a$), there arises a conflict between the adjustment of the viewer's eye lenses and the distance perceived by stereoscopic vision, and (if P moves further closer) binocular stereoscopic vision cannot be achieved. In the case of FIG. 20($b$), in stereoscopic images an object at distance ∞ is displayed with binocular parallax coinciding with the interpupillary distance of the viewer. If the binocular parallax ΔF becomes larger than that, the viewer will be unable to achieve binocular stereoscopic vision.

For recent computer graphic terminals, multisync monitors are widespread that can be switched between multiple resolution modes. The resolution (display frequency) can be switched over a wide range, for example, from a low resolution mode of 640×400-pixel screen generally used for personal computers to a high resolution mode of 2000× 1000-pixel for workstations. If one multisync display is used to switch between these image signals, the displayed size of an image consisting of the same number of dots varies according to the resolution of the image signal because the display screen size is the same. FIG. 19 shows this; that is, part (c) shows a display of a low-resolution image signal, and part (d) shows a display of a high-resolution image signal. In part (d), the displayed image is small, while in part (c), binocular parallax As is larger than Δt.

When stereoscopic CG images or the like are displayed on such a display, binocular parallax of displayed images varies greatly according to the image resolution, in some cases making it difficult for the view to achieve stereoscopic vision and thus tending to increase eye strain.

Currently, there are three types of broadcast video signals, HDTV, EDTV, and NTSC. These signal formats differ not only in resolution but also in screen aspect ratio, and hence, there arise differences in display size. Furthermore, in some display methods, the size can be changed as in a windowing environment. Accordingly, binocular parallax of displayed images varies greatly, in some cases making it difficult for the view to achieve stereoscopic vision and tending to increase eye strain.

The present invention is also intended to resolve the above-outlined problems involved in stereoscopic presentation of natural images, and it is also an object of the invention to make it possible to produce easy-to-view, natural-looking stereoscopic images by automatically adjusting the amount of binocular parallax according to the screen (window) size even when the same stereoscopic image signal is input.

SUMMARY OF THE INVENTION

According to the present invention, the fusional range computing means computes the binocular fusional range of the viewer viewing the screen of the stereoscopic image display device for displaying the stereoscopic image of the object, on the basis of the pre-entered parameters consisting at least of the size of the screen and the viewing distance between the screen and the viewer, and the camera parameter calculating means calculates the conditions for camera parameters, based on the binocular fusional range and on the object-to-camera distance generated by the distance information extraction section, so that the object in its entirety can be brought within the viewer's binocular fusional range; then, using the camera parameter determining section, the CG operator determines the camera parameters based on the output of the camera parameter calculating means, and based on three-dimensional structural information describing a three-dimensional shape of an object, using the thus determined camera parameters, the projection transformation section generates the plurality of two-dimensional projection images as viewed from the plurality of cameras.

DESCRIPTION OF THE PREFERRED EMBODIMENTS (Embodiment 1)

Figure 1:
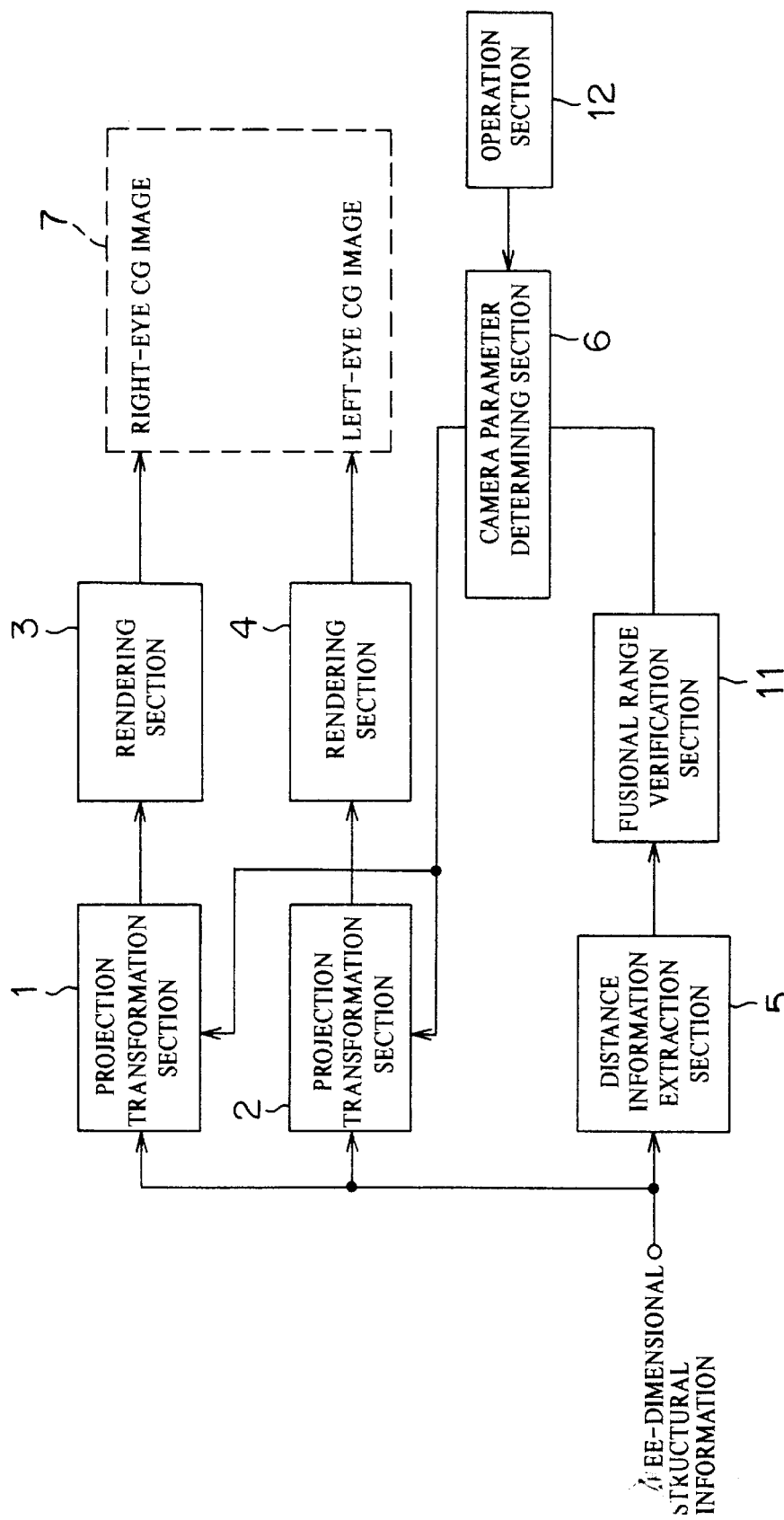
FIG. 1 is a diagram showing the configuration of a stereoscopic CG image generating apparatus according to a first embodiment of the present invention.

FIG. 1 is a diagram showing the configuration of a stereoscopic CG image generating apparatus according to a first embodiment of the present invention. In FIG. 1, reference numerals 1 and 2 are projection transformation sections and 3 and 4 are rendering sections; these sections are the same as those used in the prior art stereoscopic CG generating apparatus. The present embodiment differs from the prior art stereoscopic CG image generating apparatus in that a distance information extraction section 5, a fusional range verification section 11, a camera parameter determining section 6, and an operation section 12 are added. The fusional range verification section 11 includes a fusional range calculating means and a camera parameter calculating means.

The operation of the stereoscopic CG image generating apparatus of the present embodiment will be described below. First, three-dimensional structural information, describing a three-dimensional shape of an object by a surface model, is input to the projection transformation sections 1 and 2 as well as to the distance information extraction section 5. While checking the output images produced on a stereoscopic image display device (not shown) connected to the rendering sections 3 and 4, a CG operator arranges the object and an imaginary camera (at midpoint between left and right cameras) at appropriate positions in the world coordinate system as he desires, thus determining its direction. The left and right cameras are arranged at positions of −Wc and +Wc, respectively, along the x-axis with the imaginary camera position V at its origin (see FIG. 2). It is assumed here that the camera parameters at this time (the camera spacing Wc, the focal length f, and the distance dx to the converging point to be described later with reference to FIG. 3) are preset as initial values. (The camera spacing Wc used here refers to half the distance between the left and right cameras. The same applies hereinafter unless otherwise stated.) Next, the distance information extraction section 5 extracts from the object a point nearest to the imaginary camera (near point N) and a point farthest from the imaginary camera (far point F). The x, y coordinates of these points are calculated, and defined as N(XN, YN, ZN) and F(XF, YF, ZF), respectively (see FIG. 2). If these two points both fall within the binocular fusional range of the viewer, a good stereoscopic CG image is obtained. In this case, the far point and near point may be determined comprehensively by calculating the average of the distances from the imaginary camera and left and right cameras, etc.

Figure 3:
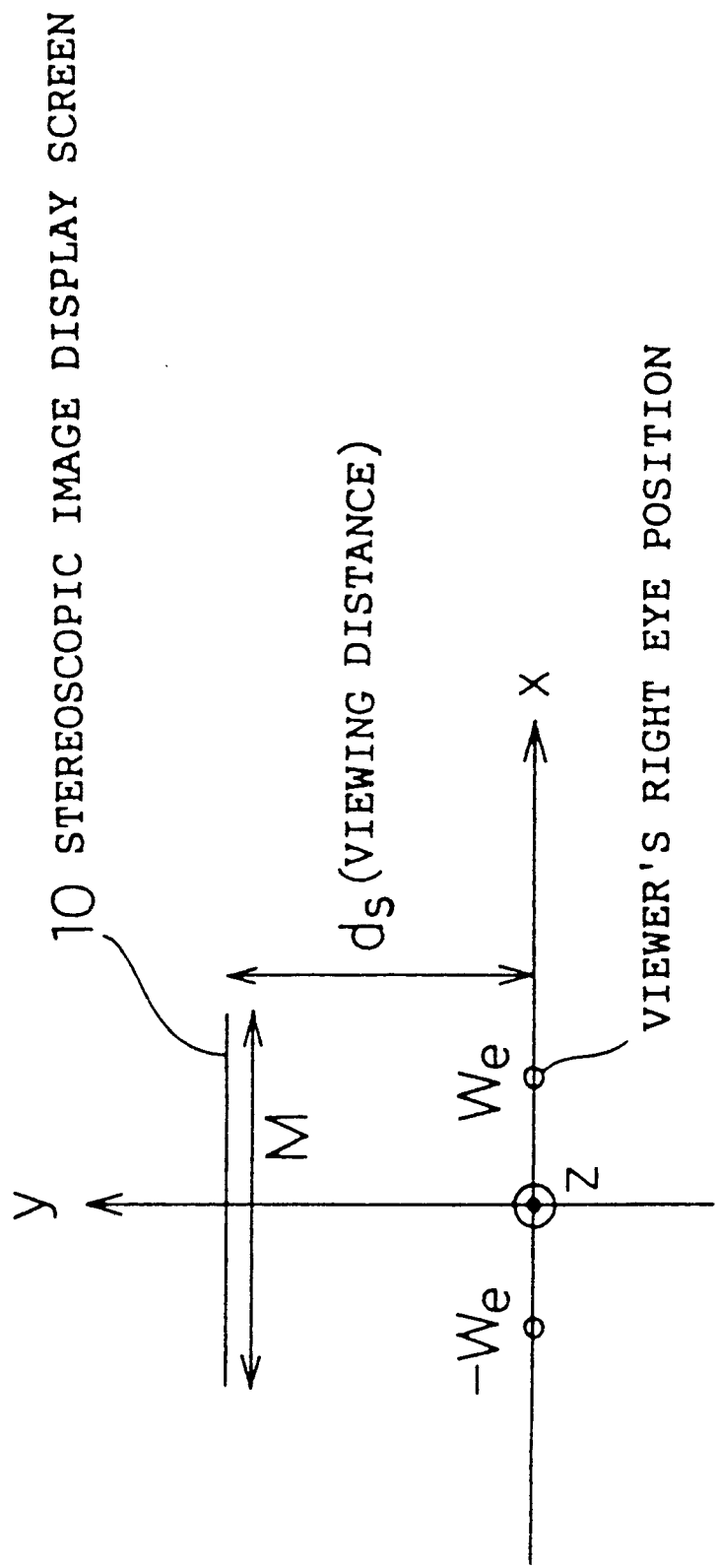
FIG. 3 is a diagram showing a viewer space (defining the space where stereoscopic images are viewed) according to the present invention.

Based on the three-dimensional coordinates of the near point N and far point F, and on the viewer's viewing distance ds and the screen size M of the stereoscopic image display device on which stereoscopic CG images are displayed for viewing (ds and M are parameters entered in advance), the fusional range verification section 11 calculates an effective range (where the viewer can achieve binocular fusing) of the camera parameters (camera spacing Wc, camera focal length f, and distance dx from camera converging point to imaginary camera position V). Viewer space parameters are defined as shown in FIG. 3.

Mathematical expressions for the calculations are give below.

Near point condition:

[Mathematical 1]

$$2 \cdot d_s \cdot \tan\frac{D^-}{2} < -\frac{Mf W_C}{d_x}\left\{ Ⓐ \right\} + 2\Delta S$$

Far point condition:

[Mathematical 2]

$$2 \cdot d_s \cdot \tan\frac{D^+}{2} > -\frac{Mf W_C}{d_x}\left\{ Ⓑ \right\} + 2\Delta S$$

$$\left( \text{or } 2W_e > -\frac{Mf W_C}{d_x}\left\{ Ⓑ \right\} + 2\Delta S \right)$$

where $$Ⓐ = \frac{\frac{d_x}{W_C}(x_N + W_C) + y_N}{y_N + (X_N + W_C)\frac{W_C}{d_x}} - \frac{\frac{d_x}{W_C}(x_N - W_C) + y_N}{y_N - (x_N - W_C)\frac{W_C}{d_x}}$$

$$Ⓑ = \frac{\frac{d_x}{W_C}(x_F + W_C) + y_F}{y_F + (x_F + W_C)\frac{W_C}{d_x}} - \frac{\frac{d_x}{W_C}(x_F + W_C) + y_F}{y_F - (x_F - W_C)\frac{W_C}{d_x}}$$

where 2×ΔS indicates the phase difference between left and right images on the stereoscopic image display screen; usually, 2×ΔS is set equal to the viewer's interpupillary distance (about 60 mm). Further, D− and D+ represent binocular parallaxes at the nearest point and the farthest point, respectively, within the range where the viewer can achieve binocular fusion.

The focal length f and the field of view, θ, of a camera have a unique relationship with each other as expressed by [Mathematical 3];

[Mathematical 3]

$$\tan\frac{\theta}{2} = \frac{1}{2 \cdot f}$$

therefore, either may be used to define the parameter. Also, dx can be automatically determined by the camera position and the three-dimensional position of a point to which the camera is directed. The fusional range verification section 11 calculates every possible combination of the camera spacing Wc, camera focal length f, and distance dx from camera converging point P to imaginary camera position V, that satisfies both of the above expressions.

In Mathematical 1, D+ and D− indicate the limit values inside which the viewer can achieve binocular fusion. These values depend on the size of the image display screen presented to the viewer. The fusional range verification section 11 stores in advance the values of the binocular fusional range corresponding to the image display screen, and based on them, evaluates the viewer's fusional range.

Next, the camera parameter determining section 6 determines which of the camera parameter combinations calculated by the fusional range verification section 11 is to be used.

For example, one of the following methods is used. (1) While checking the output images by operating the operation section 12, the CG operator tries various camera parameter combinations calculated by the fusional range verification section 11 and selects one that he thinks gives the best result.

(2) The CG operator first determines one of the camera parameters, Wc, f, and dx, then, changes the remaining two parameters, by operating the operation section 12, arbitrarily within parameter combinations presented from the fusional range verification section 11 (combinations of the two parameters that satisfy the expressions of Mathematical 1 and Mathematical 2), and while checking the output images, determines the combination that he thinks give the best result.

(3) The CG operator first determines two of the camera parameters, Wc, f, and dx, then, changes the remaining one parameter, by operating the operation section 12, arbitrarily within the parameter range presented from the fusional range verification section 11 (the range of the one parameter that satisfies the expressions of Mathematical 1 and Mathematical 2), and while checking the output images, determines one that he thinks gives the best result.

The methods of (1) to (3) will be described in further detail below.

Figure 5B:
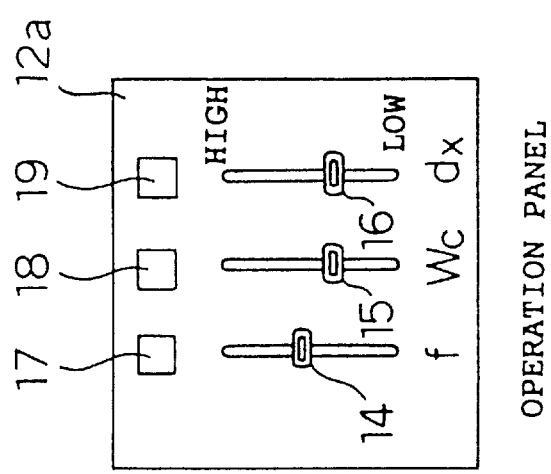
FIG. 5($a$) is a diagram showing an example of a display produced on a display section in an operation section according to the first embodiment, and FIG. 5($b$) is a diagram showing an operation panel of the operation section.
Figure 5A:
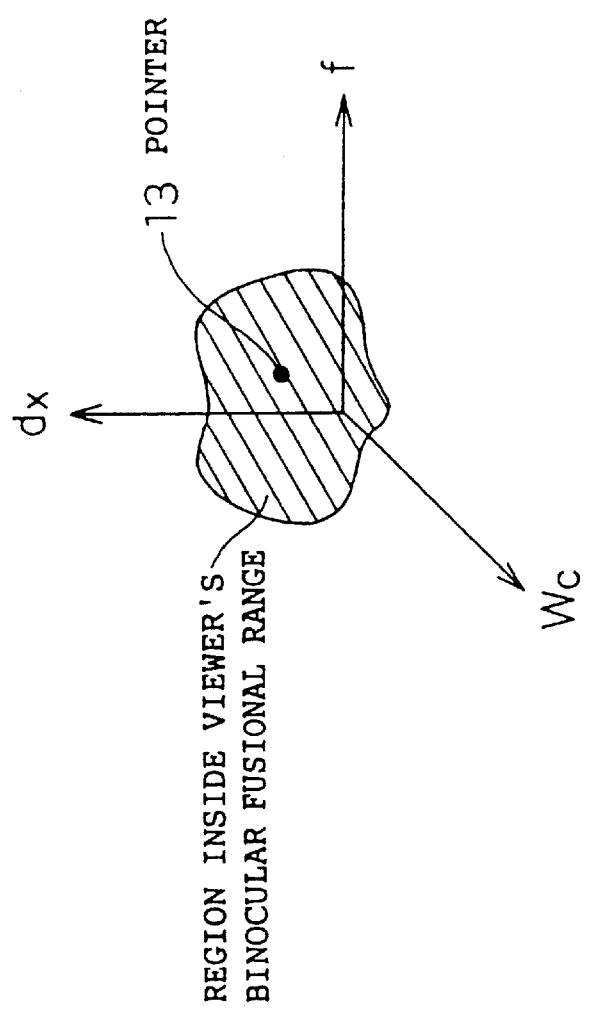

In the case of (1), a region (effective region) defining combinations of parameters, Wc, f, and dx, where the viewer can achieve binocular fusion, is displayed, along with a pointer 13 indicating the current combination of Wc, f, and dx, on a display section arranged on the operation section 12, as shown in FIG. 5(a).

The CG operator changes the position of the pointer by using a three-dimensional mouse or the like. At this time, the values of Wc, f, and dx change as the pointer position changes, but the pointer cannot be moved outside the effective region. The parameters at the coordinate position pointed to by the pointer are output to the camera parameter determining section 6, and stereoscopic images to be output are calculated by the projection transformation sections 1 and 2 and the rendering sections 3 and 4. By viewing the image produced on the stereoscopic image display device, the CG operator adjusts the position of the pointer as he desires. In this way, control is performed so that the output stereoscopic CG images are always produced within the viewer's binocular fusional range.

In the case of (2) and (3), as shown in FIG. 5(b), a control panel 12a is provided which comprises three volume controls 14, 15, and 16 for adjusting the respective parameters, and three lock buttons 17, 18, and 19 for locking the respective parameters. It is assumed here that initially the lock buttons are not pressed ON. While viewing the output stereoscopic CG image, first the CG operator selects, for example, the focal length f out of the camera parameters and determines to set it to f0 on the operation panel 12a (FIG. 5(b)) by considering the field of view. The operator then sets the volume control 14 to f0 and presses the lock button 17. The parameter f is thus locked to f0. When the parameter f is locked, the fusional range verification section 11 calculates combinations of the remaining parameters Wc and dx which satisfy both Mathematical 1 and Mathematical 2.

Next, the CG operator changes the parameters Wc and dx by operating the volume controls 15 and 16 while checking the output images. Here, provisions are made so that the parameters Wc and dx that the CG operator is going to set can be changed only within the ranges of Wc and dx values that satisfy both Mathematical 1 and Mathematical 2. At this time, one or the other of the two parameters, Wc or dx, can be locked by the lock button 18 or 19. Then, only the remaining one parameter is changed while checking the output stereoscopic CG images. In this way, the parameters can be determined one by one while constantly keeping the output stereoscopic CG image within the viewer's binocular fusional range.

Using the camera parameters Wc, f, and dx determined in the above manner, the projection transformation sections 1 and 2 calculate the two-dimensional positions of the object that would be projected on films when photographed by the right and left cameras, respectively, and the rendering sections 3 and 4 determine the brightness and color of an image within each polygon on the basis of the material of the object, the type of the light source used, and the three-dimensional positions. Finally, stereoscopic CG images for the left and right eyes are output.

Figure 2:
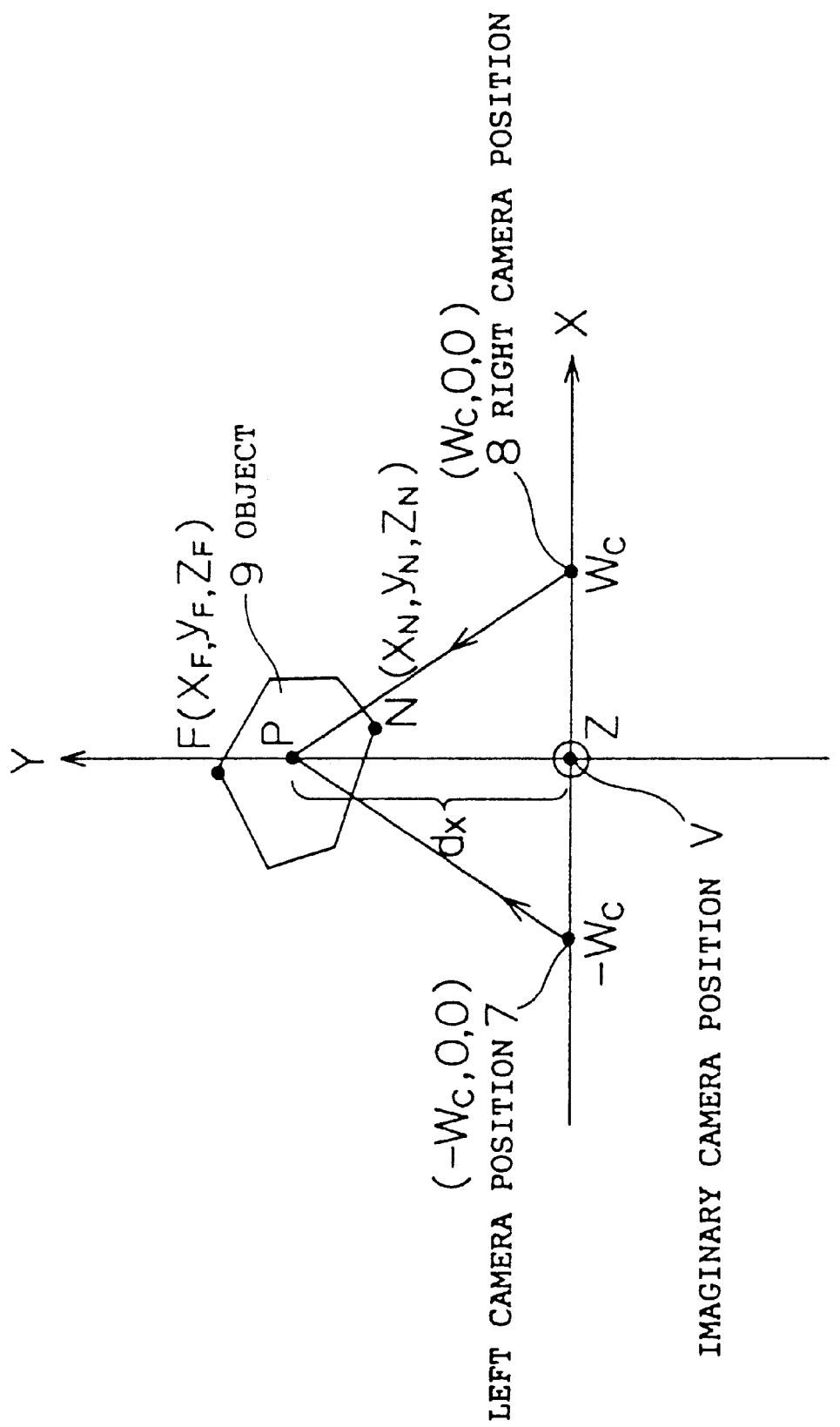
FIG. 2 is a diagram showing the relationship between an object and camera positions in a CG space (world coordinate system) according to the present invention.
Figure 4:
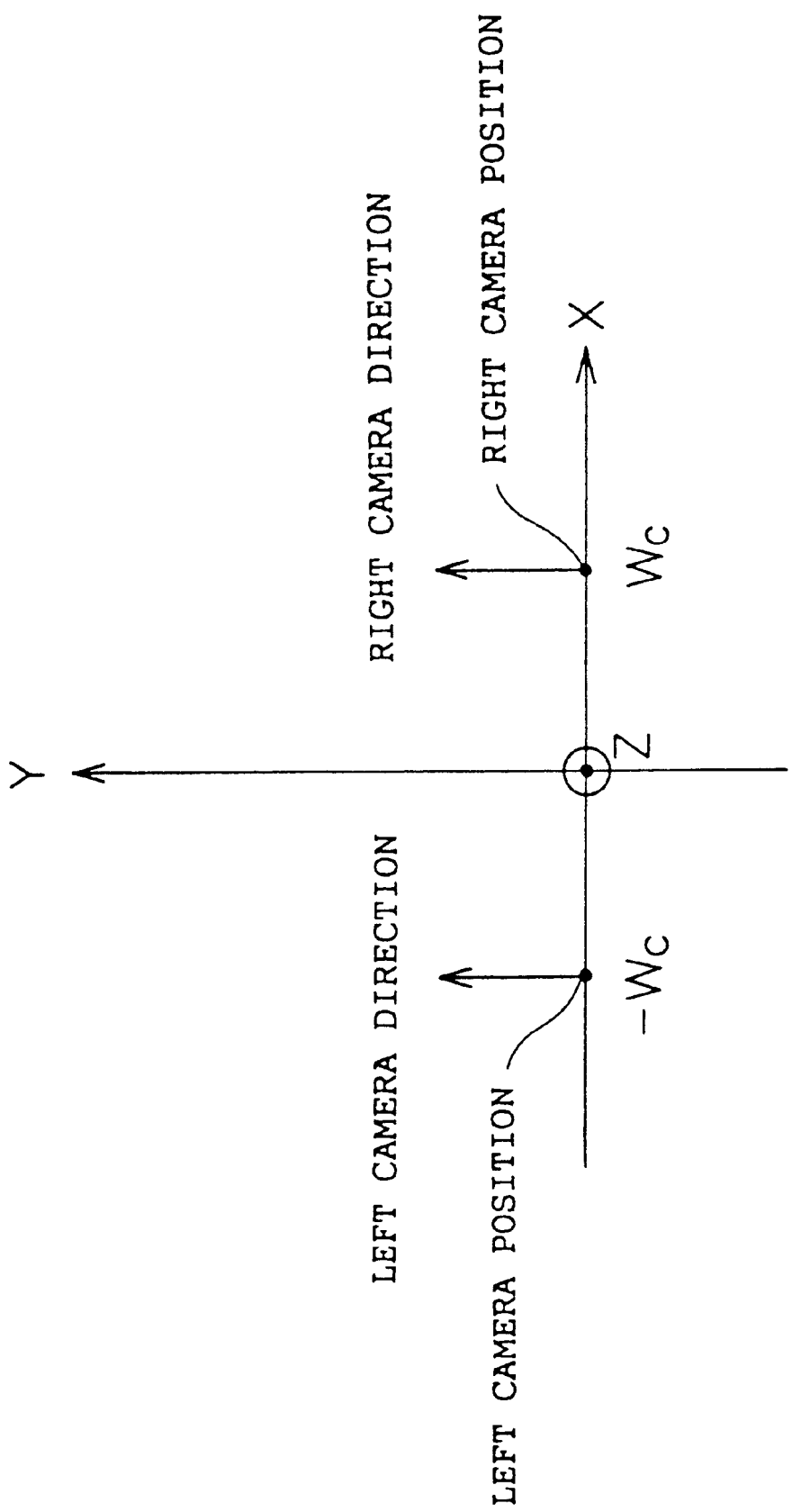
FIG. 4 is a diagram showing a stereoscopic image parallel shooting method according to the present invention.

The present embodiment has been described by assuming the camera arrangement for converging shooting (in FIG. 2, the left and right cameras 7 and 8 are arranged both pointing in the direction of point P). Alternatively, the left and right cameras may be arranged in parallel to each other as shown in FIG. 4. In this case, the fusional range verification section 11 need not use the three-dimensional coordinate values of the far point of the object, but need only calculate combinations of Wc and f that satisfy the condition expressed by Mathematical 4.

[Mathematical 4]

$$W_C < -\frac{y_N - f}{Mf}\left(d_S \cdot \tan\frac{D^-}{2} - \Delta S\right)$$

(This setting is equivalent to setting dx at ∞.)

In the present embodiment, the limits of the viewer's binocular fusional range are given by Mathematical 1 and Mathematical 2. Alternatively, D− and D+ in these expressions or depthwise distances corresponding to these parameters may be entered manually by the CG operator.

In the present embodiment, the camera parameters are determined based on one CG image data, but in the case of moving images also, the camera parameters can be determined in like manner by using CG image data at each of successive time instants. Furthermore, if a camera parameter sequence over a certain period is determined and stored in advance, it is possible to play back the same scene any number of times by using the stereoscopic camera parameters having the same pattern of change.

As described above, according to the present embodiment, the camera-to-object distance information and the magnitude of parallax of generated stereoscopic CG images on the display device are calculated from the size of the display device and the viewing distance, and by checking whether the CG images fall within the viewer's binocular fusional range, proper camera parameters (focal length or field of view, camera spacing, and converging point) are determined. In this manner, easy-to-view stereoscopic CG images can be obtained automatically.

(Embodiment 2)

Figure 6:
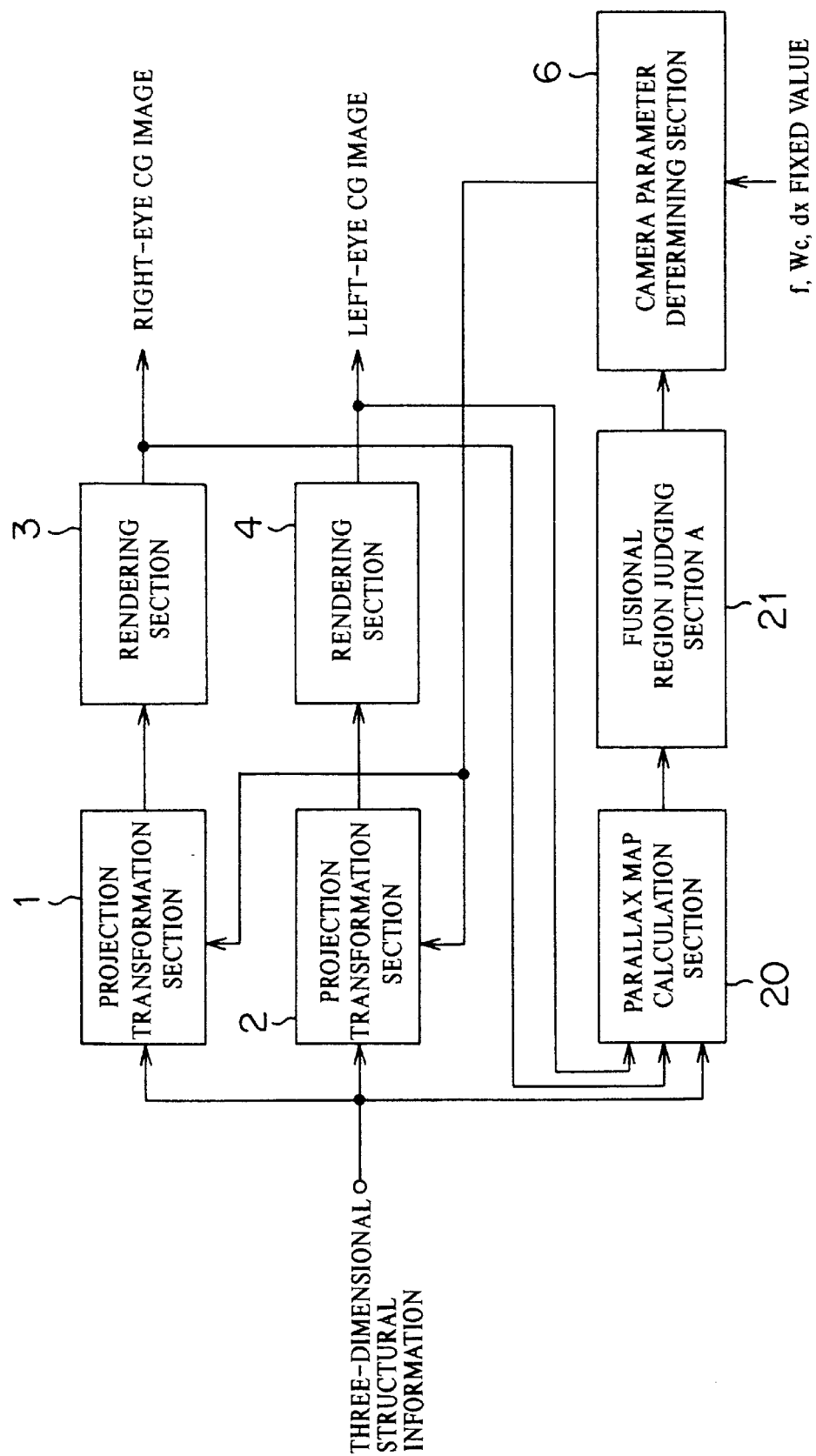
FIG. 6 is a diagram showing the configuration of a stereoscopic CG image generating apparatus according to a second embodiment of the present invention.

FIG. 6 is a diagram showing the configuration of a stereoscopic CG image generating apparatus according to a second embodiment of the present invention. In FIG. 6, reference numerals 1 and 2 are projection transformation sections, 3 and 4 are rendering sections, and 6 is a camera parameter determining section; these sections are the same as those used in the stereoscopic CG generating apparatus of the first embodiment. The present embodiment differs from the stereoscopic CG image generating apparatus of the first embodiment in that the distance information extraction section 5 and fusional range verification section 11 in FIG. 1 are replaced by a parallax map calculation section 20 and a fusional region judging section A 21 which acts as a pixel count calculating means.

The operation of the stereoscopic CG image generating apparatus having the above configuration will be described below.

The present embodiment is particularly effective in cases where, of the camera parameters Wc, f, and dx, at least one parameter, specifically Wc, is fixed by the CG operator and, when output without any adjustment, the entire stereoscopic CG images cannot be brought within the viewer's binocular fusional range.

Three-dimensional structural information, describing a three-dimensional shape of an object by a surface model, is input to the projection transformation sections 1 and 2. As in the first embodiment, the CG operator, while checking the output images produced on the stereoscopic image display device (not shown) connected to the rendering sections 3 and 4, arranges the object and the imaginary camera (at midpoint between left and right cameras) at appropriate positions in the world coordinate system as he desires, thus determining its direction. The left and right cameras are arranged at positions of −Wc and +Wc, respectively, along the x-axis with the imaginary camera position V at its origin (see FIG. 2). The camera parameters Wc, f, and dx used here are preset as initial values (at least one of these parameters is fixed).

Using these preset parameters, the projection transformation sections 1 and 2 convert the three-dimensional structural information into images projected on a two-dimensional screen, and the resulting images are fed to the rendering sections 3 and 4 which then generate CG images.

From the outputs of the rendering sections 3 and 4 and the three-dimensional structural information, the parallax map calculation section 20 calculates the depth data of the left and right images at each point of the projection-converted converted images, that is, a parallax map (an image showing the amount of depth at each pixel). For example, by using results of Z buffer processing, a popular technique used in CG, it is possible to obtain the amount of depth at each point on the screen, and it is easy to construct a parallax map using this technique. In the case of images such as wireframes that do not involve rendering, a parallax map is constructed using the outputs of the projection transformation sections 1 and 2 and the three-dimensional structural information.

Based on the parallax map, the fusional region judging section A 21 calculates the number of pixels (this is defined as the effective pixel count), or the number of vertices of polygons, or the number of centerpoints of polygons, that are contained in a region on the screen that lies within the binocular fusional range of the viewer viewing the stereoscopic CG images (the fusional range is a range where the parallax takes a value between D− and D+, these values being dependent on the screen size, and a database storing these values is included in the fusional region judging section A 21).

Next, while successively changing the camera parameters Wc, f, and dx, the fusional region judging section A 21 calculates, based on the output of the parallax map calculation section 20, the effective pixel count for every possible combination of Wc, f, and dx within preset variation ranges, excluding, however, the parameter whose value is fixed.

Then, the camera parameter determining section 6 computes the parameters Wc, f, and dx that provide the largest effective pixel count of all the combinations of the parameters Wc, f, and dx for which the effective pixel count has been calculated. The thus computed parameters, Wc, f, and dx, are supplied to the projection transformation sections 1 and 2.

At this time, rather than selecting the maximum value of the effective pixel count, a number of combinations that provide the effective pixel count close to the maximum value may be presented for selection by the CG operator, and the selected combination may be supplied to the projection transformation sections 1 and 2.

Furthermore, of the three parameters, one or more parameters may be fixed, and the camera parameter determining section 6 may be made to present the combination of the remaining parameters that provides the largest effective pixel count, or to present a number of combinations of the remaining parameters that provide the effective pixel count close to the maximum value, for selection by the CG operator.

Using the parameters thus supplied, the projection transformation sections 1 and 2 and the rendering sections 3 and 4 compute final stereoscopic CG images. In this way, the camera parameters can be automatically determined to maximize the image portion that falls within the viewer's binocular fusional range.

If the effective pixel count has a plurality of maximum values, stereoscopic CG images are generated using the parameters for the respective cases, and the CG operator selects the desired combination of the parameters by checking the results on the stereoscopic image display apparatus.

As described, according to the present embodiment, even in cases where there are limitations on the camera parameters and the entire stereoscopic CG images produced for final output cannot be brought within the viewer's binocular fusional range, the camera parameters Wc, f, and dx can be automatically determined to maximize the image area that falls within the binocular fusional range.

In the second embodiment described above, the near point and far point of the object may be computed from the parallax map, and thereafter, based on these results, the stereoscopic camera parameters may be determined using the same method as described in the first embodiment.

(Embodiment 3)

Figure 7:
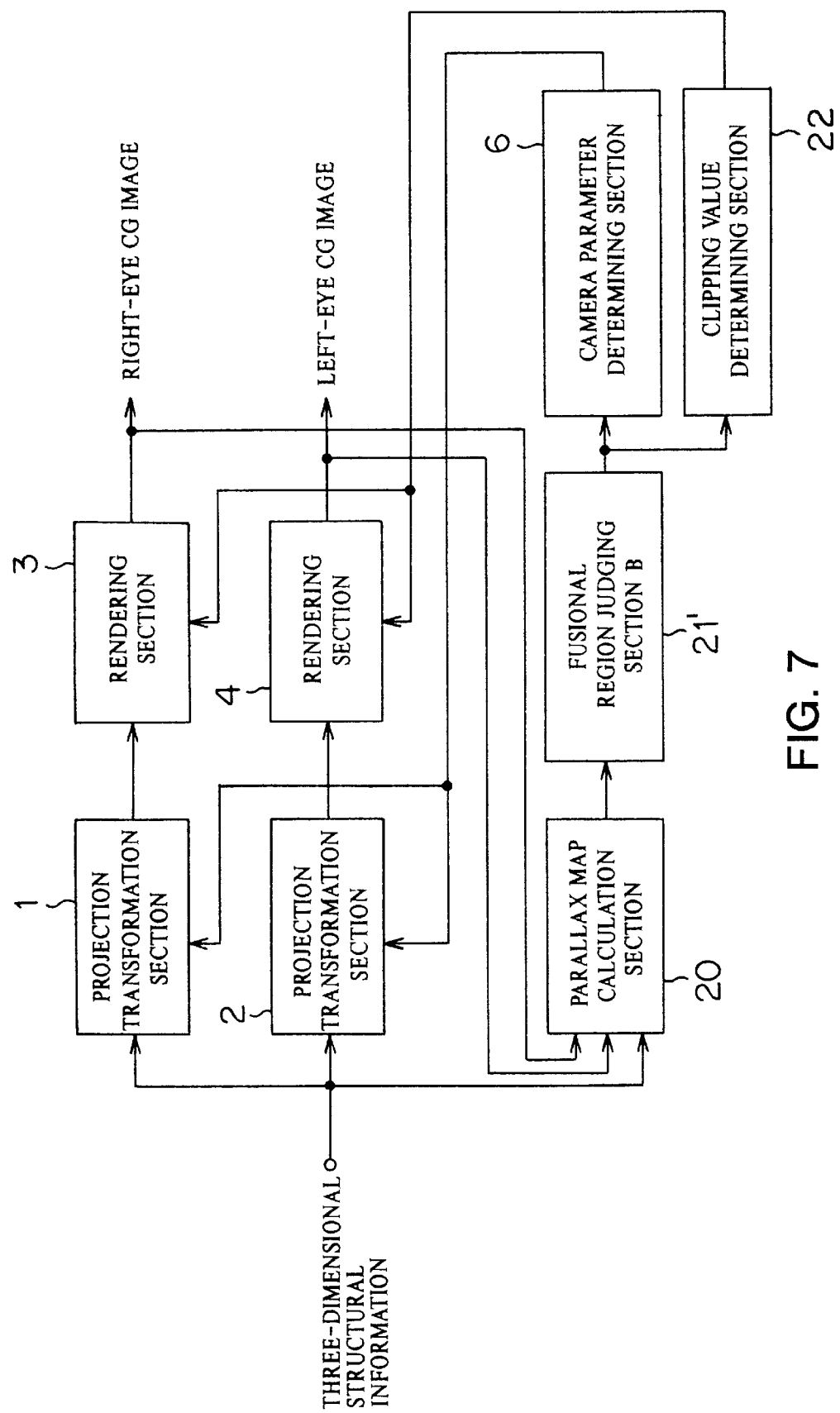
FIG. 7 is a diagram showing the configuration of a stereoscopic CG image generating apparatus according to a third embodiment of the present invention.

FIG. 7 is a diagram showing the configuration of a stereoscopic CG image generating apparatus according to a third embodiment of the present invention. In FIG. 7, reference numerals 1 and 2 are projection transformation sections, 3 and 4 are rendering sections, 6 is a camera parameter determining section, and 20 is a parallax map calculation section; these sections are the same as those used in the stereoscopic CG image generating apparatus of the second embodiment.

The differences from the stereoscopic CG image generating apparatus of the second embodiment are that the fusional region judging section A 21 is replaced by a fusional region judging section B 21' as a pixel count calculating means, and that a clipping value determining section 22 as a specific image processing section is added.

The operation of the stereoscopic CG image generating apparatus having the above configuration will be described below. First, the camera parameter determining section 6 determines the camera parameters (Wc, dx, f) to supply to the projection transformation sections 1 and 2 in the same manner as described in the foregoing second embodiment.

While checking the output images produced on the stereoscopic image display device connected to the rendering sections 3 and 4, the CG operator arranges the object and the imaginary camera at appropriate positions in the world coordinate system as he desires, thus determining its direction.

Using the thus set parameters, the projection transformation sections 1 and 2 convert the three-dimensional structural information into images projected on a two-dimensional screen, and the resulting images are fed to the rendering sections 3 and 4 which then generate CG images.

From the outputs of the rendering sections 3 and 4 and the three-dimensional structural information, the parallax map calculation section 20 calculates a parallax map at each point of the projection-converted images.

Based on this parallax map, the fusional region judging section B 21' calculates the effective pixel count of the region on the screen that lies within the binocular fusional range of the viewer viewing the stereoscopic CG images, and while successively changing the camera parameters Wc, f, and dx, calculates the effective pixel count on the basis of the output of the parallax map calculation section 20.

The fusional region judging section B 21' has a database defining relationships between screen size and fusional range, and calculates the effective pixel count by referencing this database.

Next, the camera parameter determining section 6 computes the parameters Wc, f, and dx that provide the largest effective pixel count of all the combinations of the parameters Wc, f, and dx for which the effective pixel count has been calculated. The thus computed parameters, Wc, f, and dx, are supplied to the projection transformation sections 1 and 2.

Using the parameters thus supplied, the projection transformation sections 1 and 2 and the rendering sections 3 and 4 compute final stereoscopic CG images. Once the camera parameters have been determined, their values are fixed.

Here, consider the situation where the object is moved or the left and right cameras are moved while maintaining their positional relationship. If the cameras are moved toward the object, the distance to the object decreases, and the binocular parallax increases, eventually exceeding the viewer's binocular fusional range. The same applies for the far point. To address this problem, clipping is applied while holding the camera parameters fixed.

In conventional CG image processing, the rendering sections 3 and 4 would apply clipping to a near object and a far object so that they would not be displayed. In the present embodiment, on the other hand, values defining such clipping positions are determined for the rendering sections 3 and 4, as shown in FIG. 8(a), so that images outside the binocular fusional range will not be output.

That is, the fusional region judging section B 21' calculates the limits (near limit and far limit) of the viewer's binocular fusional range. More specifically, in the world coordinate system of FIG. 8(a), all points that satisfy Mathematical 1 and Mathematical 2 are computed. In FIG. 8(a), the region consisting of such points is defined as the shaded region.

Next, a near clipping value, CLN, and a far clipping value, CLF, are determined so that those points lying outside the shaded region will not be included in the final CG images output for display. (CLNR and CLNL are near clipping planes for the right camera and left camera, respectively, and CLFR and CLFL are far clipping planes for the right camera and left camera, respectively.)

Only objects lying within the region bounded by the near clipping planes and far clipping planes are output from the rendering section 3 and 4.

Figure 8B:
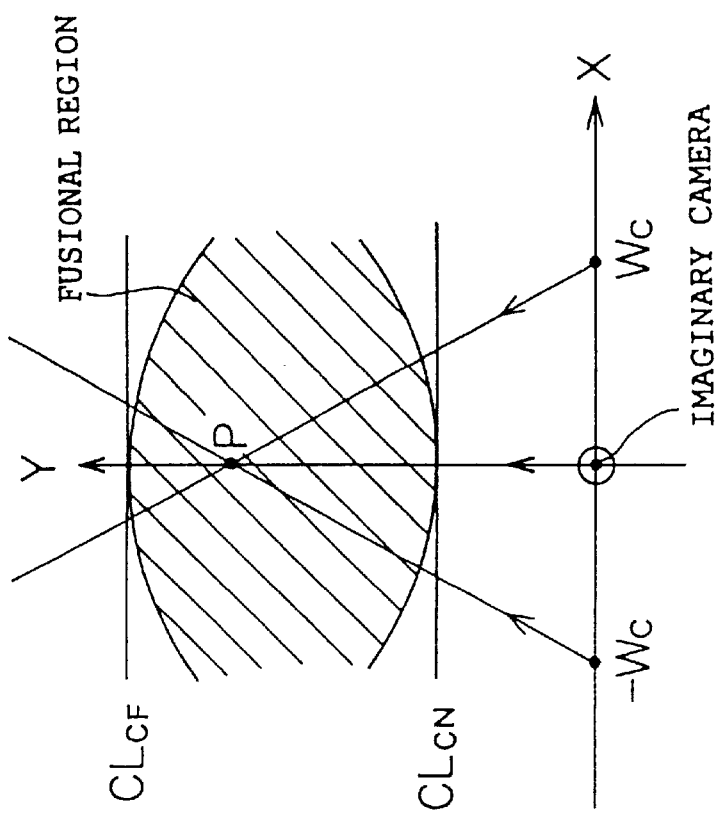
FIG. 8($a$) is a diagram showing the concept of near clipping and far clipping (independently for left and right cameras), and FIG. 8($b$) is a diagram showing the concept of near clipping and far clipping (common to left and right cameras) according to the third embodiment.
Figure 8A:
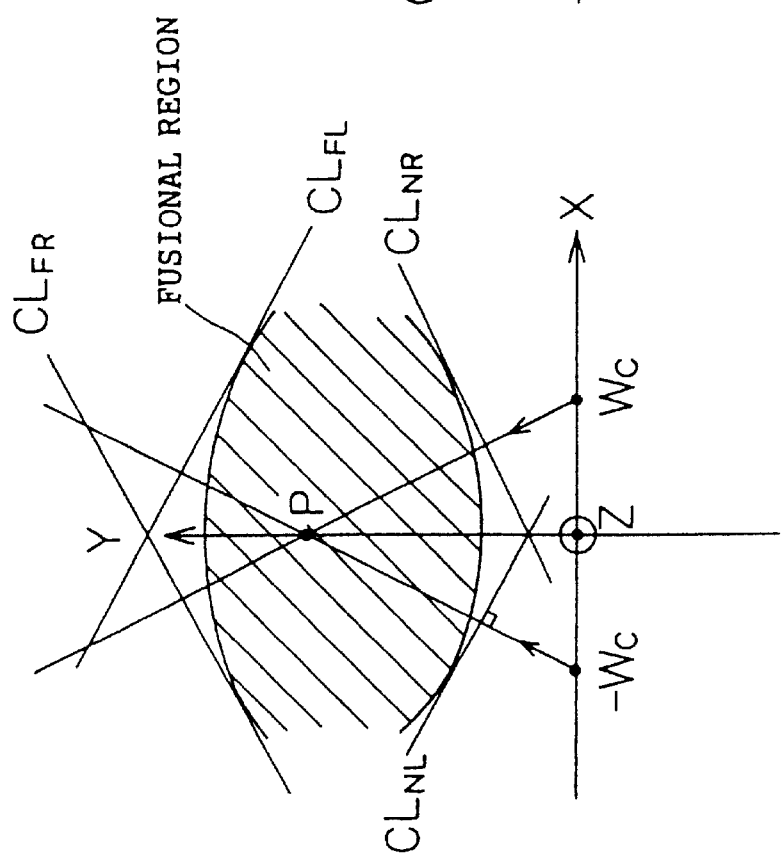

In the above example, the clipping planes, CLNR, CLNL, CLFR, and CLFL, are set for the right and left cameras, respectively, but alternatively, a near clipping plane CLCN and a far clipping plane CLCF may be determined with respect to the imaginary camera (origin), as shown in FIG. 8(b) and these may be used common to the right and left cameras.

In the present embodiment, if there is an object lying in a region to be clipped away, settings are made so that such an object will not be included in the final images output for display. Alternatively, provisions may be made to gradually lower the contrast of the object or decrease the color intensity of the object as the object approaches a region to be clipped away. In this case, since the object vanishes in a natural manner as it enters a region outside the viewer's binocular fusional range, unnaturalness can be greatly reduced in the stereoscopic CG images output for display.

As described above, according to the present embodiment, even when the camera parameters are fixed, by setting suitable clipping planes considering the viewer's binocular fusional range the final stereoscopic CG images output for display can be brought within the viewer's binocular fusional range.

(Embodiment 4)

Figure 9:
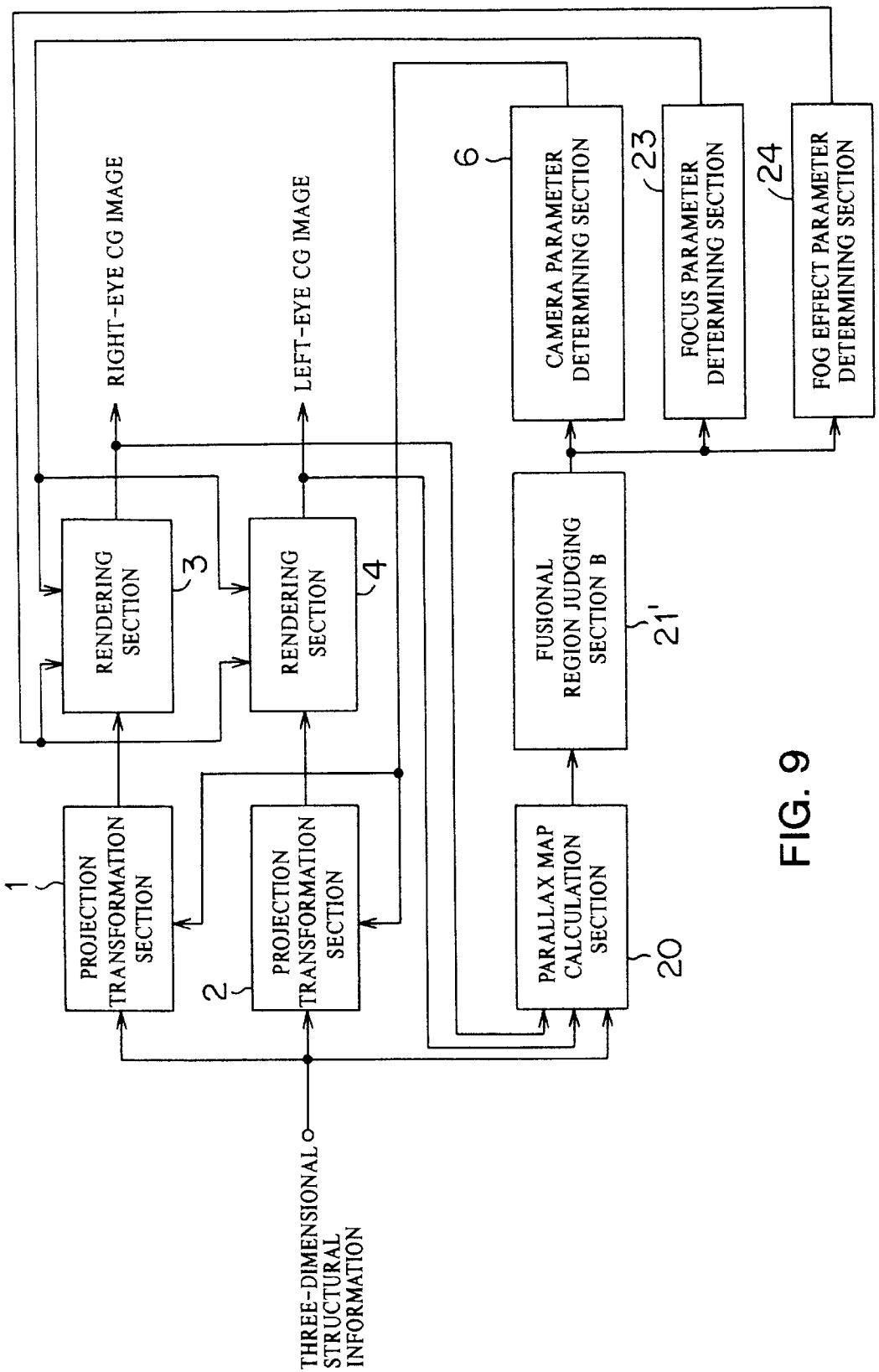
FIG. 9 is a diagram showing the configuration of a stereoscopic CG image generating apparatus according to a fourth embodiment of the present invention.
Figure 10:
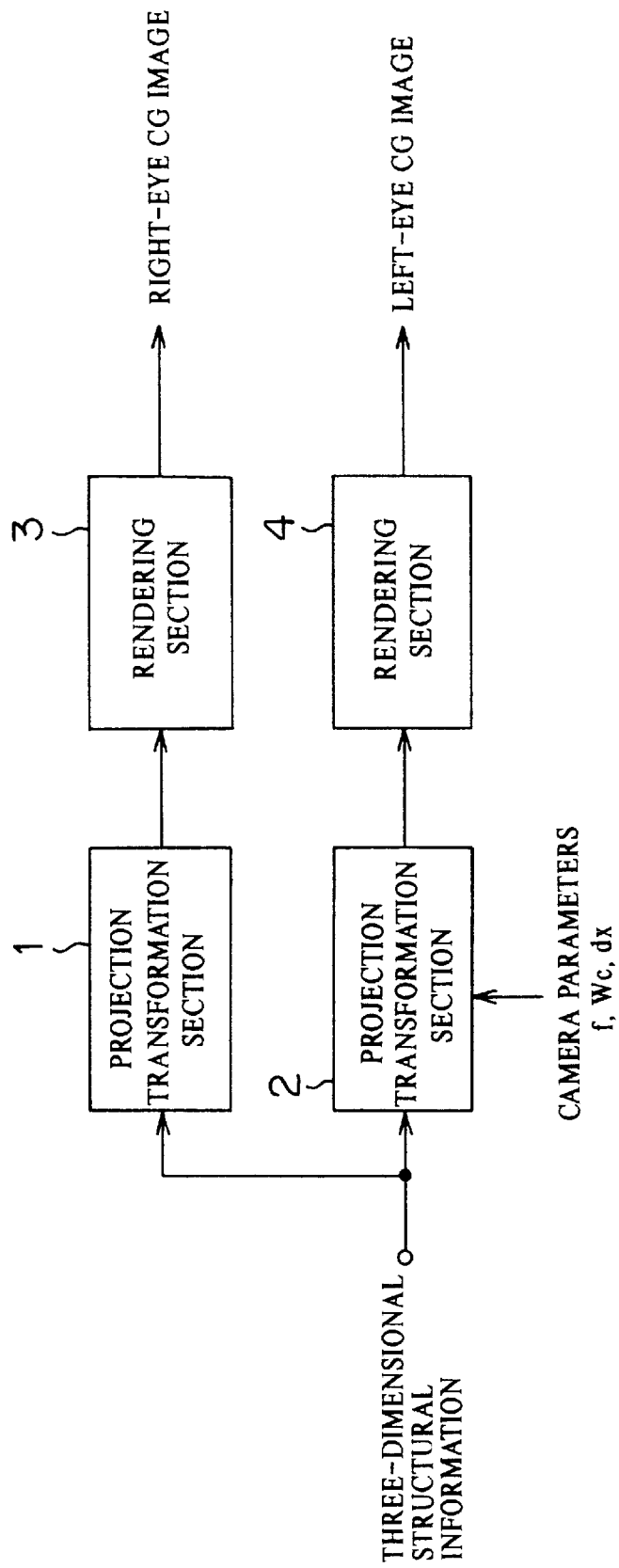
FIG. 10 is a diagram showing the configuration of a stereoscopic CG image generating apparatus according to the prior art.
Figures 11A, 11B:
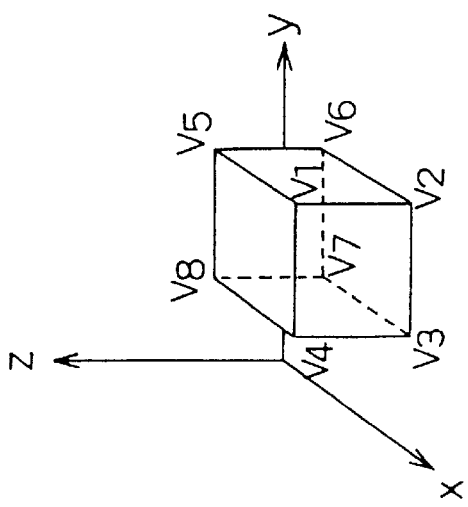
FIG. 11($a$) is a diagram showing an example of a geometric model for explaining three-dimensional structural information, and FIG. 11($b$) is a diagram showing data structure of the geometric model.
Figure 12B:
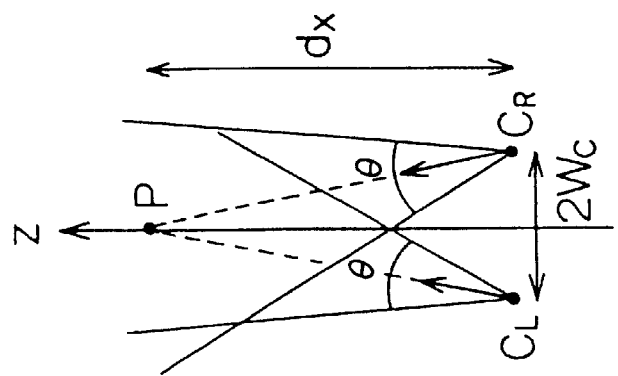
FIG. 12($a$) is a diagram showing a world coordinate system and projection transformation, and FIG. 12($b$) is a diagram showing camera parameters.
Figure 12A:
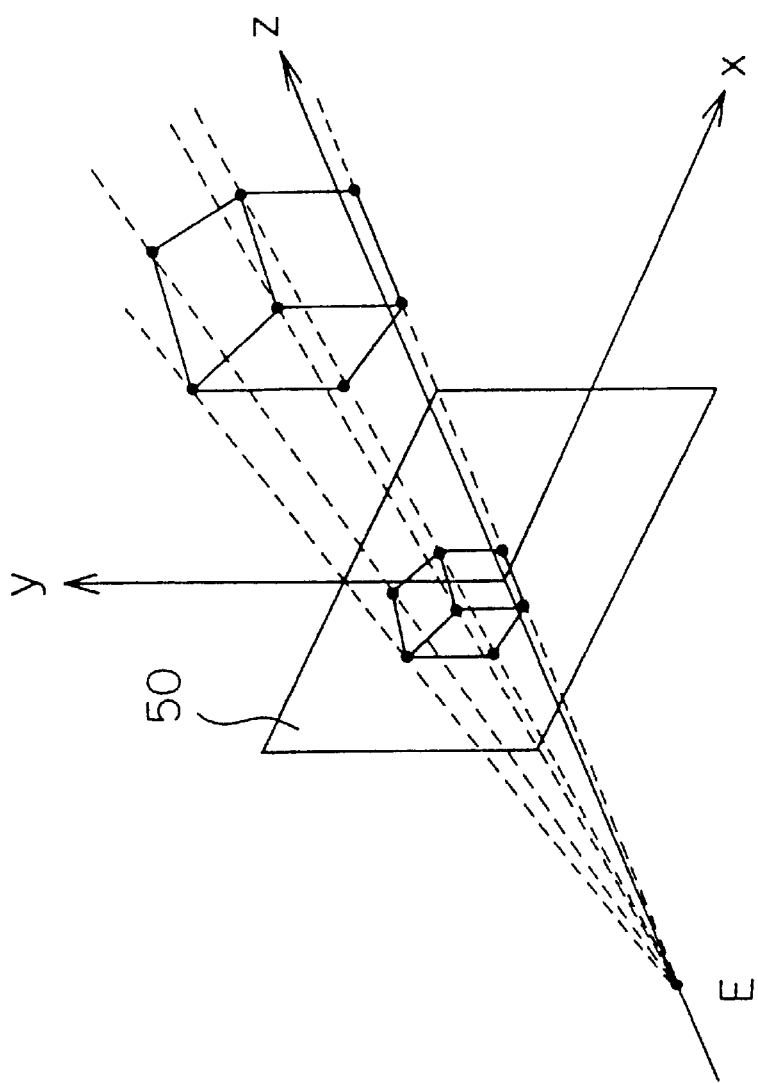

FIG. 9 is a diagram showing the configuration of a stereoscopic CG image generating apparatus according to a fourth embodiment of the present invention. In FIG. 9, reference numerals 1 and 2 are projection transformation sections, 3 and 4 are rendering sections, 6 is a camera parameter determining section, 20 is a parallax map calculation section, and 21' is a fusional region judging section B; these sections are the same as those used in the stereoscopic CG image generating apparatus of the third embodiment.

The difference from the stereoscopic CG image generating apparatus of the third embodiment is that the clipping value determining section 22 is replaced by a focus parameter determining section 23 and a fog effect parameter determining section 24, these parameters being controlled in accordance with the amount of binocular parallax of the object concerned. The focus parameter determining section 23 and the fog effect parameter determining section 24 together constitute a specific image processing section.

The operation of the stereoscopic CG image generating apparatus having the above configuration will be described below. First, the camera parameter determining section 6 determines the camera parameters (Wc, dx, f) for the projection transformation sections 1 and 2 in the same manner as in the foregoing third embodiment.

While checking the output images produced on the stereoscopic image display device connected to the rendering sections 3 and 4, the CG operator arranges the object and the imaginary camera at appropriate positions in the world coordinate system as he desires, thus determining its direction.

After that, the projection transformation sections 1 and 2 convert the three-dimensional structural information into images projected on a two-dimensional screen, and the resulting images are fed to the rendering sections 3 and 4 which then generate CG images.

Next, from the outputs of the rendering sections 3 and 4 and the three-dimensional structural information, the parallax map calculation section 20 calculates a parallax map at each point of the projection-converted images. Based on the parallax map, the fusional region judging section B 21' calculates the effective pixel count of the region on the screen that lies within the binocular fusional range of the viewer viewing the stereoscopic CG images, and while successively changing the camera parameters Wc, f, and dx, calculates the effective pixel count on the basis of the output of the parallax map calculation section 20. The fusional region judging section B 21' has a database defining relationships between screen size and fusional range, and calculates the effective pixel count by referencing this database.

Next, the camera parameter determining section 6 computes the parameters Wc, f, and dx that provides the largest effective pixel count of all the combinations of the parameters Wc, f, and dx for which the effective pixel count has been calculated. The thus computed parameters, Wc, f, and dx, are supplied to the projection transformation sections 1 and 2.

Using the parameters thus supplied, the projection transformation sections 1 and 2 and the rendering sections 3 and 4 compute final stereoscopic CG images. Once the camera parameters have been determined, their values are fixed.

In some cases, the rendering sections 3 and 4 introduce deliberate distortions, such as defocusing or fogging distant objects, to express the perspective effect when generating final CG images.

The focus parameter determining section 23 and the fog effect parameter determining section 24 determine the degrees of defocusing and fogging on the basis of the parallax map and the viewer's binocular fusional range.

For example, based on the output of the fusional region judging section B 21', the focus parameter determining section 23 calculates those regions in the world coordinate system where the viewer cannot achieve binocular fusion. More specifically, three-dimensional coordinate positions that do not satisfy either Mathematical 1 or Mathematical 2 or both are calculated.

When rendering objects lying within such regions in the rendering sections 3 and 4, the focus parameter determining section 23 outputs such a focus parameter as to give the output image a defocused and unclear appearance.

If this effect is applied gradually increasingly as the image nears a limit of the viewer's binocular fusional range, a more natural defocusing effect can be given to the image.

To achieve the defocusing effect, a camera out-of-focus condition may be simulated using traditional CG techniques such as ray tracing, or spatial filtering (e.g., low-pass filtering) may be applied to the generated CG images. There is also a technique in which, while successively changing the position of the object by small amounts according to the degree of defocusing, the same object is written a number of times to the same image memory, thereby blurring the edges. If the movement in changing the position of the object is made proportional to the distance from the camera focused plane, an out-of-focus effect can be achieved. (In the present embodiment, the movement should be made proportional to the distance from a limit of the viewer's binocular fusional range.)

In this way, defocusing is applied to objects for which the viewer cannot achieve binocular fusion. This has the effect of reducing the unnaturalness arising when binocular fusion cannot be achieved.

Similarly, based on the output of the fusional region judging section B 21', the fog effect parameter determining section 24 calculates those regions in the world coordinate system where the viewer cannot achieve binocular fusion (especially, such regions where the far point condition expressed by Mathematical 2 does not hold). The fog effect parameter determining section 24 controls the fog effect parameter so that an effect is given that makes these regions appear as if shrouded in fog when the rendering sections 3 and 4 render objects lying in these regions.

If the fog is made to become thicker as the image nears a limit of the viewer's binocular fusional range, the scene described in the CG images can be made to look more natural with distant regions appearing as if hidden behind the fog.

In this way, by applying the fog effect when the binocular parallax is so large that binocular fusion cannot be achieved, as in the case of distant objects, the unnatural feel that the viewer may have due to an inability to achieve binocular fusion can be alleviated.

In a specific method of producing a fog effect in rendering objects, a fog coefficient f (0.0 to 1.0) that decreases with increasing distance, for example, is considered. Here, f=1 means no fog, and when f=0, the image appears completely washed out.

The degree of this effect can be defined by Mathematical 5, Mathematical 6, etc., where z denotes the distance from the camera.

[Mathematical 5]

$$f=(far-z)/far-near$$

[Mathematical 6]

$$f=\exp(-density \times z)^n$$

Here, far and near respectively indicate the farthest point and the nearest point from the camera in the generated CG image, and density means the density of the fog. Rendering color is calculated by Mathematical 7.

[Mathematical 7]

$$C=f \times C_o+(1-f) \times C_f$$

Here, Co is the color of the rendered object, and Cf is the color of the fog. The fog effect parameter determining section 24 sets the coefficient f=1 when the image is inside the viewer's binocular fusional range, and smoothly changes f down to 0 as the image nears a limit of the binocular fusional range and exceeds the limit.

In this way, the rendering sections 3 and 4 generate images such that distant objects outside the binocular fusional range appear as if shrouded in fog, thereby reducing the unnaturalness arising when the binocular fusional range is exceeded.

As described above, according to the present embodiment, if objects are displayed having such binocular parallax that binocular fusion cannot be achieved, since fogging is applied to distant objects and defocusing is applied to near and distant objects, the ill effect is reduced and easy-to-view stereoscopic CG images can be generated.

(Embodiment 5)

Figure 13:
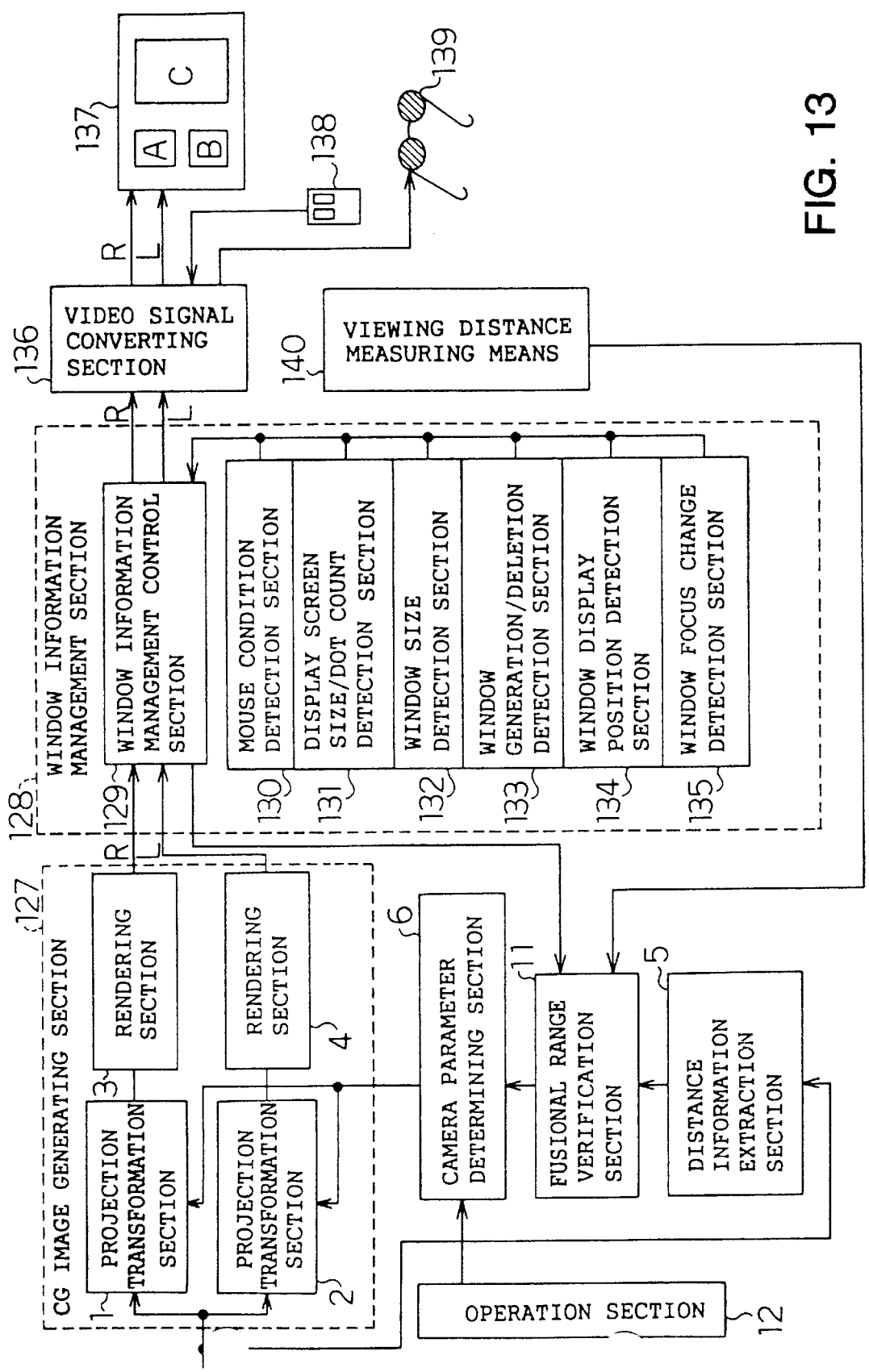
FIG. 13 is a diagram showing the configuration of a stereoscopic CG image generating apparatus according to a fifth embodiment of the present invention.

FIG. 13 is a diagram showing the configuration of a stereoscopic CG image generating apparatus according to a fifth embodiment of the present invention. In FIG. 13, reference numerals 1 and 2 are projection transformation sections, 3 and 4 are rendering sections, 6 is a camera parameter determining section, 12 is an operation section, 11 is a fusional range verification section, 5 is a distance information extraction section and 127 is a CG image generating section; these sections are the same as those used in the first embodiment. The difference from the first embodiment is the addition of the following sections: a window information management section 128, a window information management control section 129, a mouse condition detection section 130, a display screen size/dot count detection section 131, a window size detection section 132, a window generation/deletion detection section 133, a window display position detection section 134, a window focus change detection section 135, a video signal converting section 136, a stereoscopic display section 137, a mouse 138, a pair of glasses with liquid-crystal shutters 139, and a viewing distance measuring means 140.

The operation of the stereoscopic CG image generating apparatus having the above configuration will be described below.

In the present embodiment, multiple kinds of stereoscopic images are displayed simultaneously in different windows of different sizes on a computer screen in a windowing environment which has recently become a predominant operating environment. On the other hand, in the first to fourth embodiments, the image display size was the screen size of the display device itself.

It is assumed here that, as shown in the stereoscopic display section 137 of FIG. 13, there are different windows, A, B, and C, on the same screen, each showing a different stereoscopic image.

Existing stereoscopic display techniques can be used to display stereoscopic images. In the present embodiment, the so-called time-multiplexing stereoscopic image display technique is used in which stereoscopic images converted by the video signal converting section 136 into video signals are input to the stereoscopic display section 137 and the viewer views the stereoscopic images through the liquid-crystal shutter glasses 139. More specifically, the video signal converting section 136 supplies the R and L video signals alternately, that is, first R, then L, then R, then L, and so on, in time multiplexing for display on the stereoscopic display section 137; when the right-eye image is displayed, the right-eye glass of the liquid-crystal shutter glasses 139 admits light and the left-eye glass blocks light, and when the left-eye image is displayed, the situation is reversed. In this way, the right-eye and left-eye images can be presented independently to the right eye and left eye of the viewer. Any other existing stereoscopic image display technique (such as using polarizers or lenticular lenses) may be employed. Usually, the viewer is allowed to resize the windows A, B, and C as he desires by using the mouse 138.

Figure 22:
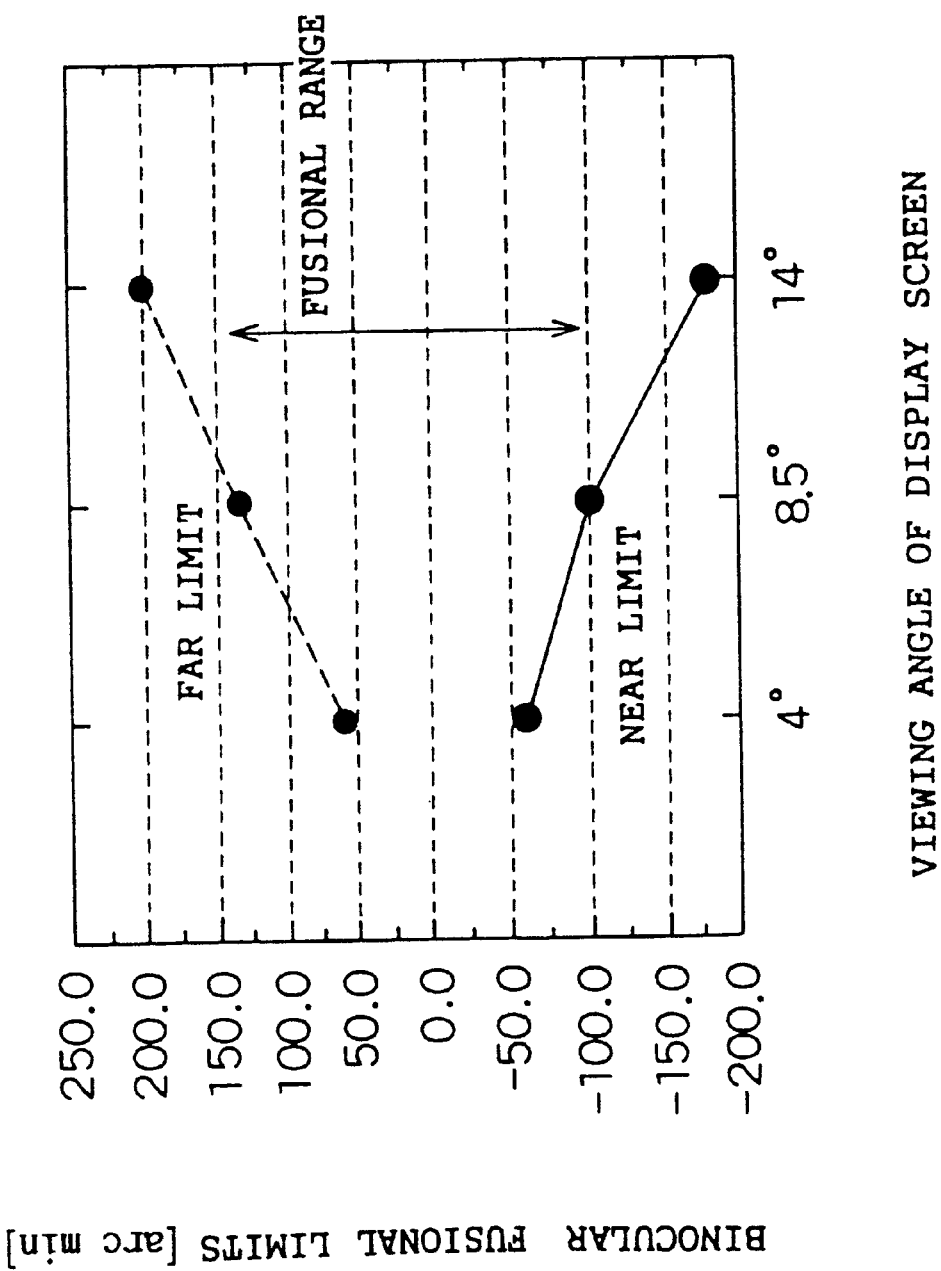
FIG. 22 is a diagram showing the relationship between viewing angle of display screen and binocular fusional limits.

When the display screen size of stereoscopic images changes as a result of a change in window size, the viewer's binocular fusional range also changes. FIG. 22 shows the relationship between the screen size (viewing angle) for displaying stereoscopic images and the maximum fusional parallax (expressed in angles, unit being [arc min]). It is shown that the allowable binocular fusional range changes as the display screen size changes. A larger screen size provides a larger fusional range. Accordingly, when the window size is reduced while the window is displaying the same stereoscopic image, the resulting parallax may exceed the binocular fusional range; therefore, the sizes of all the windows must be monitored constantly, and the camera parameters must always be determined accordingly. More specifically, information about the window operated by the viewer using the mouse is detected by the window information management control section 129, and based on the detected information, the screen sizes of all the windows currently displayed are supplied to the fusional range verification section 11. In operation, the windows currently displayed are managed by the window generation/deletion detection section 133, and the size of each individual window is determined by the window display position detection section 134, window size detection section 132, and display screen size/dot count detection section 131. More specifically, the size of each window actually displayed (in inches, centimeters, etc.) is calculated from the display screen size (in inches), the horizontal and vertical dot counts of the display (these can be computed by detecting synchronization frequencies), and the size of the window (dot count), and the thus calculated window size is supplied to the fusional range verification section 11. The screen size, for example, can be obtained by having the window information management section 128 control the video signal converting section 136 and the number of dots displayed on the stereoscopic display section 137.

The remainder of the process is the same as that described in the first embodiment. That is, the distance information obtained from the three-dimensional structural information is detected by the distance information extraction section 5, and using this distance information and the distance, ds, between viewer and display surface measured by the viewing distance measuring means 140, the camera parameters are calculated by Mathematical 1 and Mathematical 2. The camera parameters are supplied to the projection transformation sections 1 and 2, and the right-eye and left-eye images, R and L, are calculated by the rendering sections 3 and 4 respectively. This processing is performed separately for each of the stereoscopic display windows detected by the window information management section 128.

As described above, in a display system having a windowing environment for displaying a plurality of stereoscopic images, the window information management section 128 supervises the size of each window, and the camera parameters are controlled, and hence the parallax is controlled, so that the stereoscopic image displayed in each window comes within the viewer's binocular fusional range. In this way, easy-to-view, natural-looking images can be presented.

In the fifth embodiment, using the output of the window focus change detection section 135, the camera parameters may be changed only for the window specified by the viewer's mouse operation so that only the stereoscopic image displayed in the viewer's attention window is controlled within the binocular fusional range. In this way, the operational efficiency of the present invention can be enhanced.

In any of the first to fourth embodiments, the viewing distance between the viewer and the display screen may be measured using the viewing distance measuring means 140 shown in the fifth embodiment.

As described so far, according to the present invention, the distance information between the camera and object and the magnitude of parallax of generated stereoscopic CG images displayed on the display device are calculated from the display size and the viewing distance, and based on which proper camera parameters (focal length or field of view, camera spacing, and converging point) are determined. In this way, easy-to-view stereoscopic CG images can be obtained automatically.

The first to fifth embodiments have been described using binocular stereoscopic images, but this is not restrictive. For multinocular stereoscopic images also, if the same techniques as described above are applied to determine the camera parameters for all pairs of images presented to the left and right eyes of the viewer, multinocular stereoscopic CG images can be generated easily.

In the first to fifth embodiments, the camera parameters have been determined so as to bring the stereoscopic CG images within the viewer's binocular fusional range for the entire screen generated. However, in the case of a scene that forces the viewer to focus his attention on a particular object on the screen, for example, other regions than the attention object may be set so that binocular fusion cannot be achieved for such regions. In such cases, the CG operator can easily set such regions on the output screen that need not be brought within the viewer's binocular fusional range so that data from these regions are not used in determining the camera parameters.

In the first to fifth embodiments, stereoscopic images for the left and right eyes are obtained by CG, but any of the embodiments is also applicable for real images shot by a stereoscopic camera. In that case, the focal length f of the plurality of cameras, the camera spacing Wc, the camera-to-converging point distance dx (the distance from the point of intersection between the optic axes of the cameras to the centerpoint between the plurality of cameras) can be directly used as the camera parameters for the actual camera. In this case, however, the variable M in Mathematical 1 and Mathematical 2 is not the screen size, but the ratio between the size of the light-receiving surface of the camera's imaging device and the size of the screen where stereoscopic images are actually displayed.

In the fourth embodiment, both the focus parameter determining section 23 and the fog effect parameter determining section 24 have been provided, but only one or other of the two may be provided.

In any of the first to fifth embodiments, the camera parameters have been determined so as to bring the stereoscopic CG images within the viewer's binocular fusional range for the entire screen generated, but this is not restrictive. Rather, provisions may be made so that the CG operator can set such regions on the output screen that need not be brought within the viewer's binocular fusional range, and so that data from these regions are not used in determining the camera parameters.

In any of the first to fifth embodiments, processing sections, such as the distance information extraction section and the fusional range verification section, have each been implemented using dedicated hardware, but instead, the same functions may be implemented in software using a computer.

(Embodiment 6)

Figure 14:
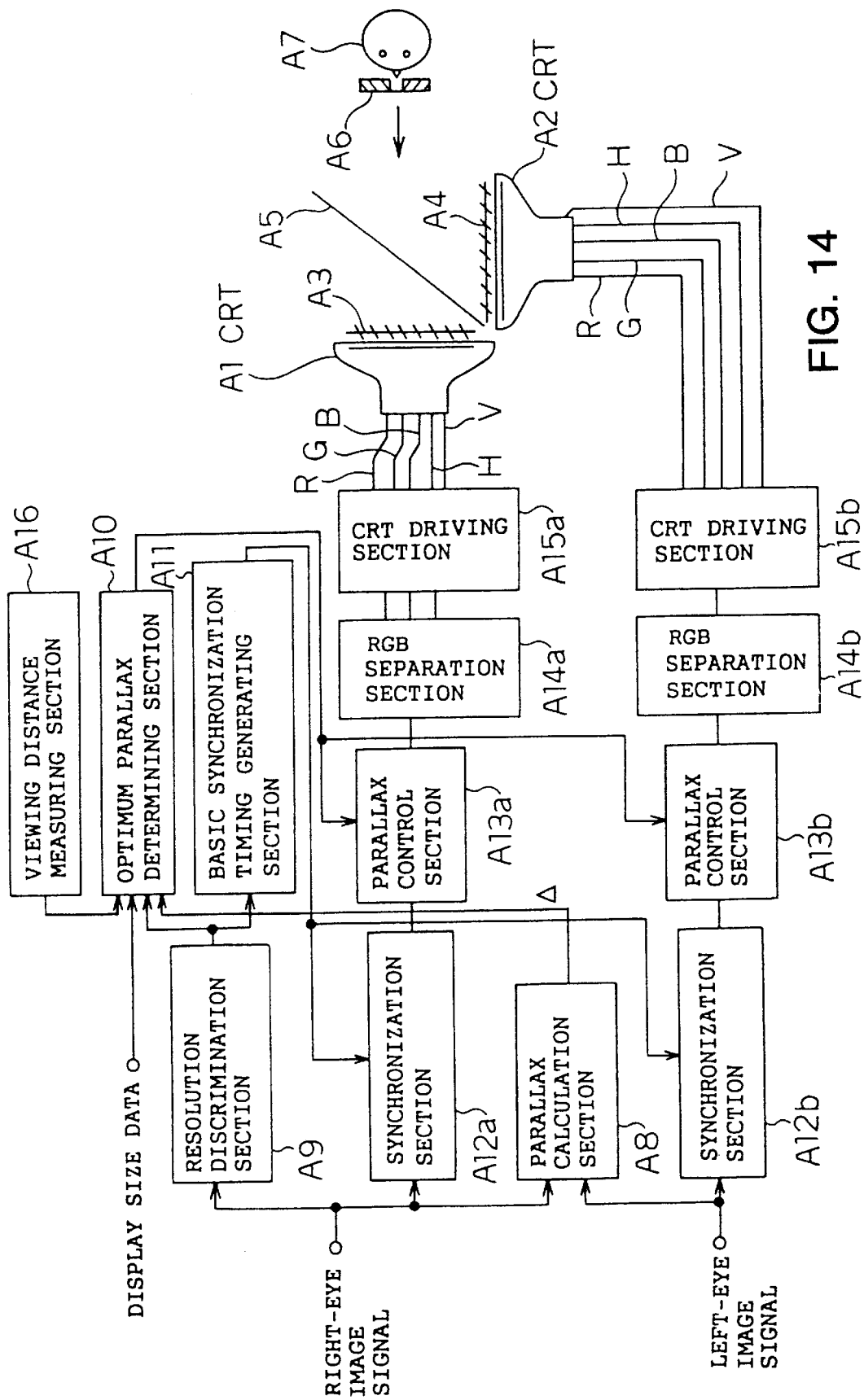
FIG. 14 is a diagram showing the configuration of a stereoscopic TV apparatus according to a sixth embodiment of the present invention.

FIG. 14 is a diagram showing the configuration of a stereoscopic TV apparatus according to a sixth embodiment of the present invention. In FIG. 14, A1 and A2 are CRTS, A3 and A4 are linear polarizers, A5 is a half-silvered mirror, A6 is a pair of glasses formed from polarizing filter, A7 is a viewer, A8 is a parallax calculation section, A9 is a resolution discrimination section, A10 is an optimum parallax determining section, A11 is a basic synchronization timing generating section, A12a and A12b are synchronization sections, A13a and A13b are parallax control sections, A14a and A14b are RGB separation sections, A15a and A15b are CRT driving sections, and A16 is a viewing distance measuring section.

The operation of the stereoscopic TV apparatus having the above configuration will be described below. First, a right-eye image signal is applied to the resolution discrimination section A9, the synchronization section A12a, and the parallax calculation section A8.

The resolution discrimination section A9 detects the horizontal and vertical frequencies of the input image signal and discriminates the resolution of the input image. The basic synchronization timing generating section A11 generates synchronization timing data matching. the detected horizontal and vertical frequencies of the input image, and supplies the data to the synchronization sections A12a and A12b, which are thus synchronized to the input image signal and generate synchronization timing necessary for subsequent processing.

From the right-eye and left-eye image signals, the parallax calculation section A8 calculates depth information (this is defined as a parallax map) at each point of the input image. A variety of methods are proposed for parallax map calculation. A block matching method that involves correlation computation will be described below.

Figure 15:
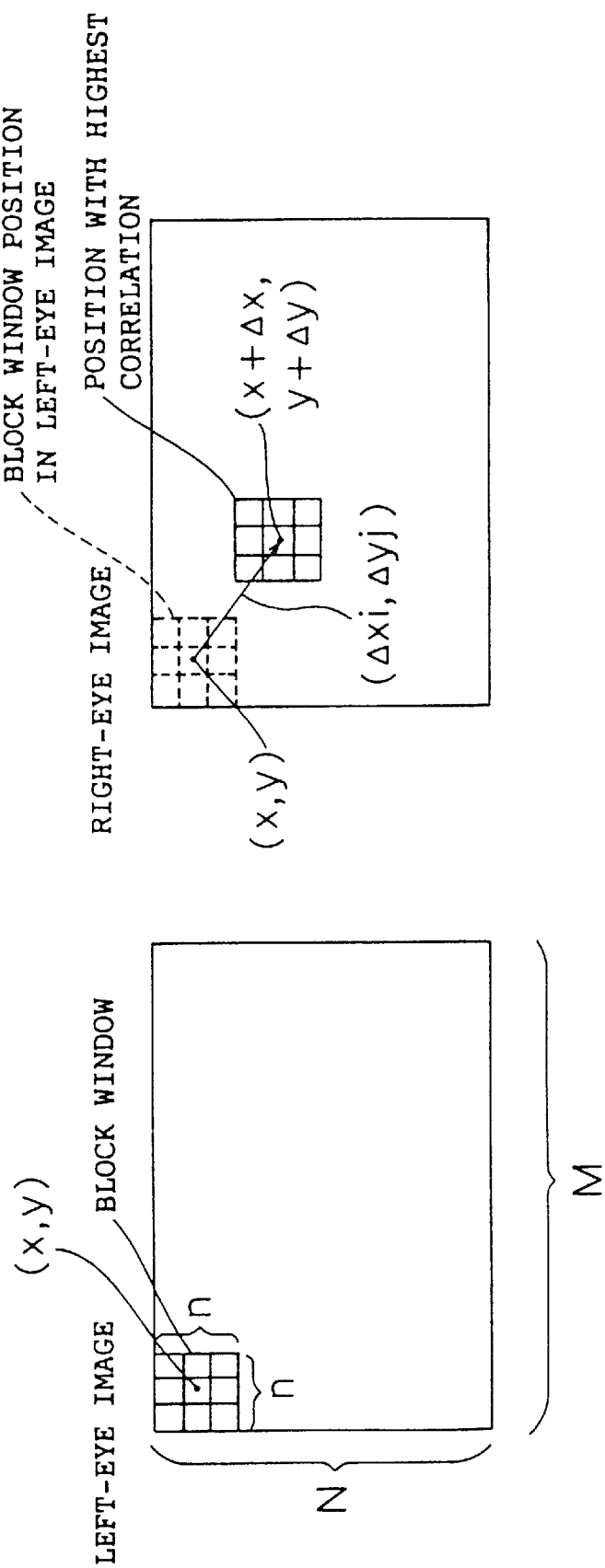
FIG. 15 is a diagram showing the operation of a parallax calculation section according to the present invention.

In FIG. 15, consider left-eye and right-eye images each of N×M size. In the left-eye image, consider a block window of n×n pixels (3×3 pixels in the figure). The same image as shown in this block window is located in the right-eye image by using a window of the same size. At this time, the displacement between the left and right blocks is represented by a vector ($\Delta x$, $\Delta y$), whose horizontal component $\Delta x$ indicates the binocular parallax of the left-eye and right-eye images at the center coordinates of the block windows.

By horizontally shifting the block window position in the reference left-eye image in sequence across the entire screen, and by finding the corresponding block position (representing the binocular parallax) in the right-eye image for each shifted block position, a parallax map (showing depthwise distance at each position on the screen) can be obtained for the entire screen. The displacement between the left-eye and right-eye images at coordinates (x, y), that is, the binocular parallax ($\Delta x$, $\Delta y$), can be expressed as [Mathematical 8]

$$\Delta x = i, \text{ for Min } \{Corr (i, j)\}$$

where

[Mathematical 9]

$$Corr(i, j) = \sum_{k=1}^{n \times n} |GL(Xk, Yk) - GR(Xk - i, Yk - j)|$$

In Mathematical 9, $\Sigma$ means taking the sum of the absolute values by varying the coordinates xk, yk within the block window of n×n. GR(xk, yk) and GL(xk, yk) represent luminance values at coordinates (xk, yk) in the right-eye and left-eye images, respectively.

In the binocular parallax $\Delta x$, $\Delta y$, the component that directly indicates the depthwise position is $\Delta x$. When the value of the binocular parallax is positive, the right-eye image is positioned to the right and the left-eye image to the left of the reference image, and the object lies behind the depthwise position where binocular parallax is 0; on the other hand, when the value of the binocular parallax is negative, this means that the object is positioned in front of the depthwise position where binocular parallax is 0.

From the parallax map obtained in the above manner, the parallax calculation section A8 outputs, for example, the largest value (the binocular parallax of the farthest object). Instead of simply extracting the maximum value of the binocular parallax, spatial low-pass filtering may be applied, or a plurality of extraction regions may be preset and calculations may be made using a statistical technique.

Next, the optimum parallax determining section A10 determines the amount of horizontal translation of the left-eye and right-eye images so that the viewer of the stereoscopic TV can fuse the displayed stereoscopic images. This translation amount is determined on the basis of the output of the resolution discrimination section A9 (the result obtained by judging the image resolution and aspect ratio based on the kind of input image signal detected), the image display size (in this case, CRT diagonal size expressed in inches), the output of the parallax calculation section A8 (the parallax map), and the distance between viewer and display surface measured by the viewing distance measuring section A16.

The optimum parallax determining section A10 has a database defining relationships between display screen size and viewer's fusional limits, and by referencing this database, determines the amount of horizontal translation so that the viewer can achieve binocular fusion.

The method of determining this will be described in further detail. Denoting the largest binocular parallax output from the parallax calculation section A8 by $\Delta$ (dots), the horizontal dot count of the input image signal detected by the resolution discrimination section A9 by DH, the horizontal length of the display CRTs A1 and A2 by L, and the viewer's viewing distance measured by the viewing distance measuring section A16 by ds, the largest parallax Dm on the screen is given by [Mathematical 10].

[Mathematical 10]

$$\frac{\Delta}{DH} \cdot L \equiv Dm$$

The left-eye and right-eye images are translated horizontally so that Dm becomes almost equal to the viewer's binocular parallel condition or provides a smaller angle than this. For example, to make the maximum value of the binocular parallax coincide with the viewer's binocular parallel condition, the amount of horizontal translation, Dc, is given by [Mathematical 11].

[Mathematical 11]

$$Dc = Dm - We$$

Here, We is the interpupillary distance of the viewer, which, in practice, is adjusted by shifting the left-eye and right-eye images in opposite directions horizontally by Dc/2. The amount of translation, Dc, may be adjusted, as necessary, based on the result derived from the above equation.

Further, in Mathematical 10, if the smallest binocular parallax (the largest parallax when displaying the object in the foreground on the screen) is set as $\Delta$, then the optimum parallax determining section A10 determines the amount of horizontal translation of the screen so that Dm becomes smaller than the viewer's largest fusional parallax (which varies depending on the screen size).

Based on the thus obtained amount of horizontal translation, Dc, the parallax control sections A13a and A13b move the right-eye and left-eye images in opposite directions horizontally by Dc/2. Then, the image signals are separated by the RGB separation sections A14a and A14b into the R, G, and B signals, which are supplied to the CRTS A1 and A2 via the CRT driving sections A15a and A15b. The images displayed on the CRTs A1 and A2 are linearly polarized by the respective polarizers A3 and A4 oriented at right angles to each other, and the polarized images are combined by the half-silvered mirror A5. By wearing the polarizing glasses A6 with their planes of linear polarization oriented in directions corresponding to the polarizers A3 and A4, the viewer A7 can view the left-eye image with his left eye and the right-eye image with his right eye, thus achieving stereoscopic vision.

As described above, according to.the present embodiment, by discriminating the kind of input image signal and computing the size of the display screen, the viewer can always view natural-looking stereoscopic images displayed with optimum binocular parallax.

(Embodiment 7)

Figure 16:
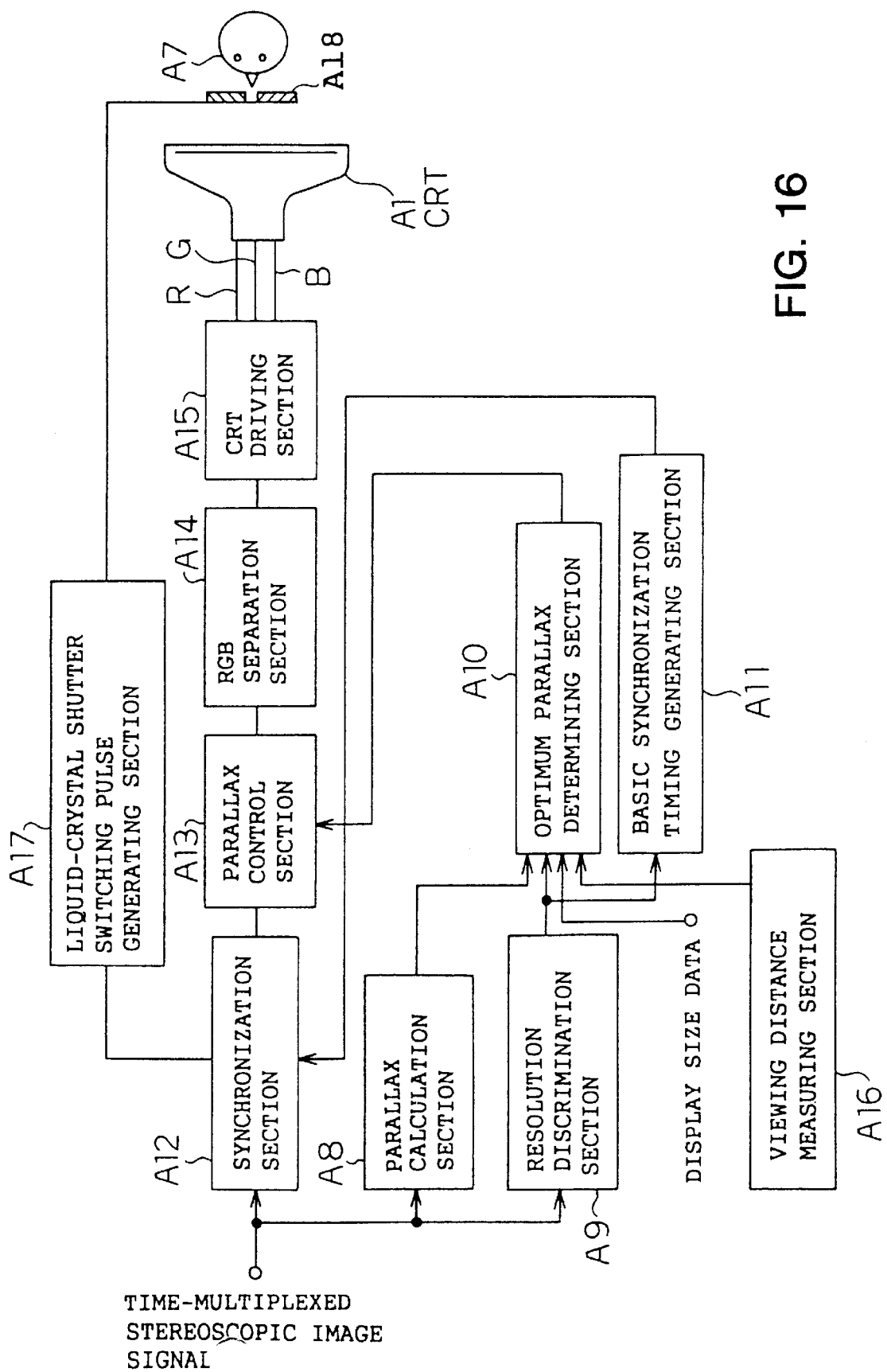
FIG. 16 is a diagram showing the configuration of a stereoscopic TV apparatus according to a seventh embodiment of the present invention.

FIG. 16 is a diagram showing the configuration of a stereoscopic TV apparatus according to a seventh embodiment of the present invention. In FIG. 16, A1 is a CRT, A18 is a pair of liquid-crystal shutter glasses, A7 is a viewer, A8 is a parallax calculation section, A9 is a resolution discrimination section, A10 is an optimum parallax determining section, A11 is a basic synchronization timing generating section, A12 is a synchronization section, A13 is a parallax control section, A14 is an RGB separation section, A15 is a CRT driving section, A16 is a viewing distance measuring section, and A17 is a liquid-crystal shutter switching pulse generating section.

This configuration is an adaptation of the stereoscopic TV apparatus of the sixth embodiment for use with a field sequential stereoscopic image signal.

The operation of the stereoscopic TV apparatus having the above configuration will be described below. The basic operation is the same as the sixth embodiment, but since the left-eye and right-eye images are time-multiplexed on one stereoscopic image signal and are input alternately with each other, as shown in FIG. 17, the following processing becomes necessary.

Figure 17:
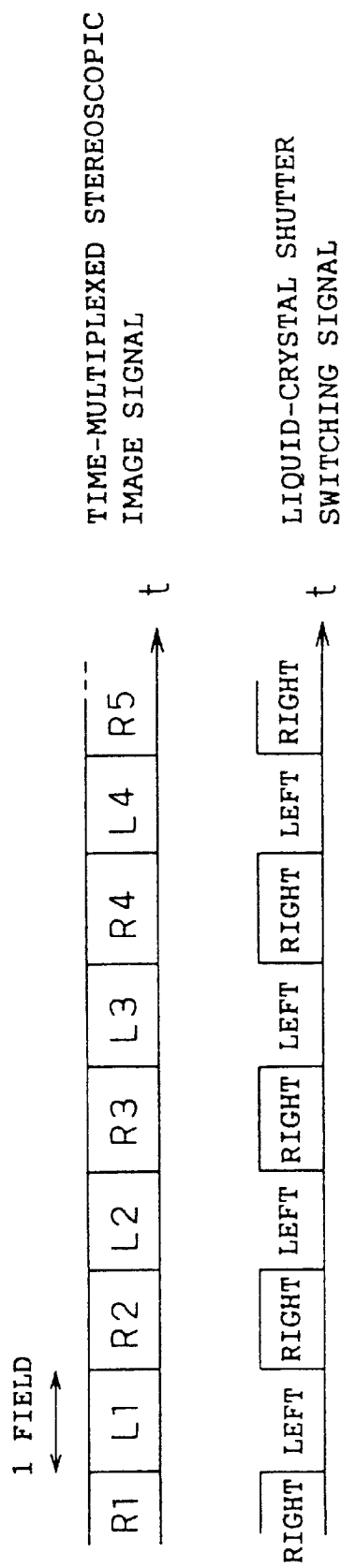
FIG. 17 is a diagram showing a time-multiplexed stereoscopic image signal according to the seventh embodiment of the present invention.
Figure 18:
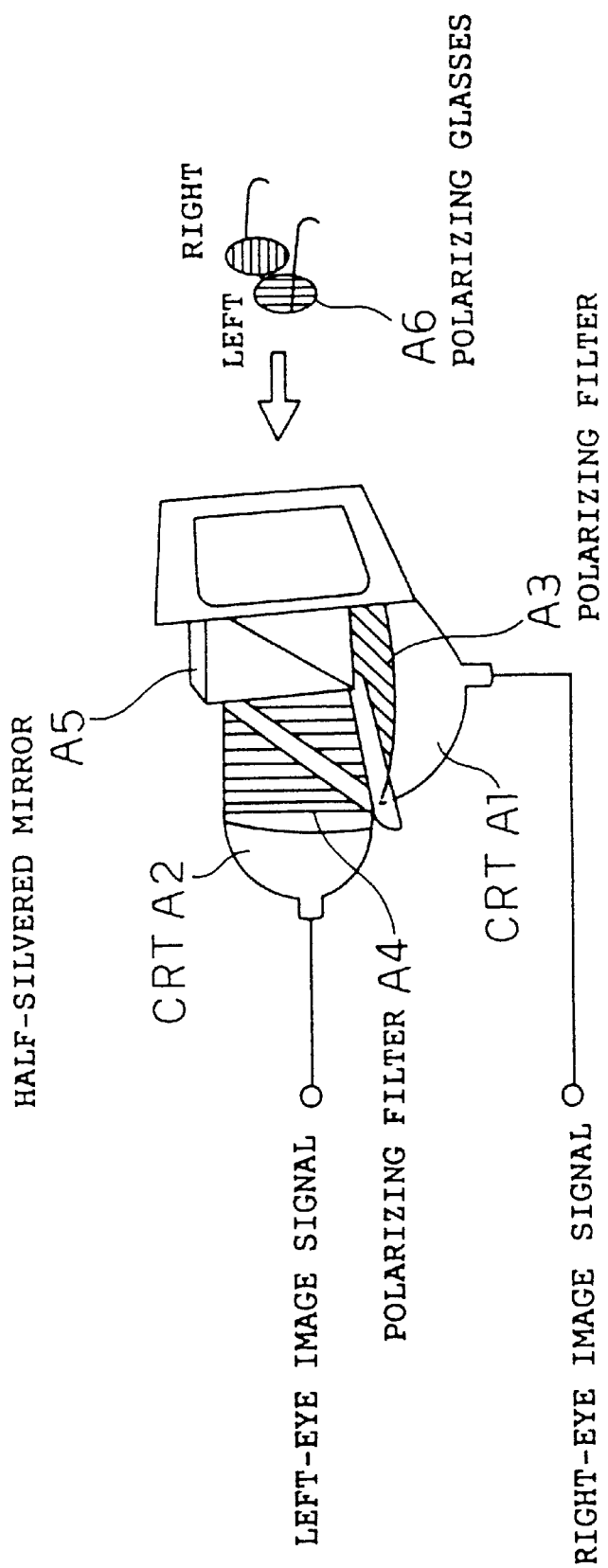
FIG. 18 is a diagram showing the configuration of a stereoscopic TV apparatus according to the prior art.
Figure 19B:
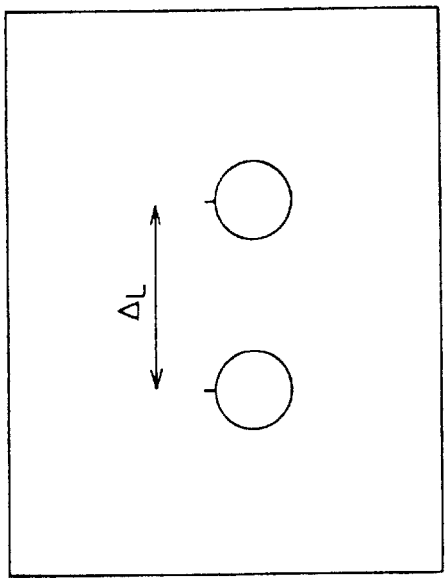
FIG. 19 is a diagram showing relationships between binocular parallax and display image size and image resolution.
Figure 19D:
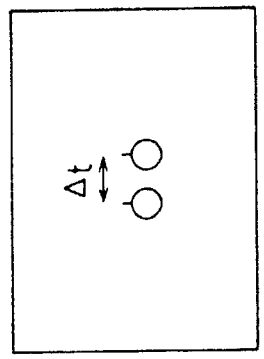
Figure 19A:
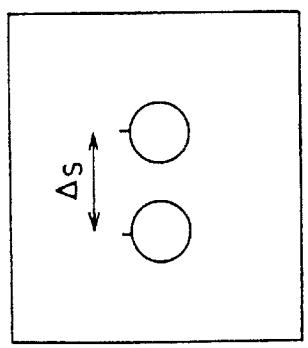
Figure 19C:
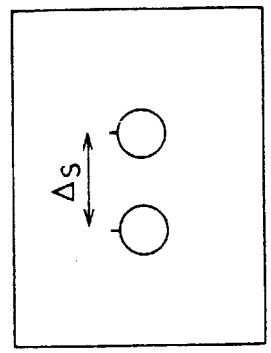
Figures 20A, 20B:
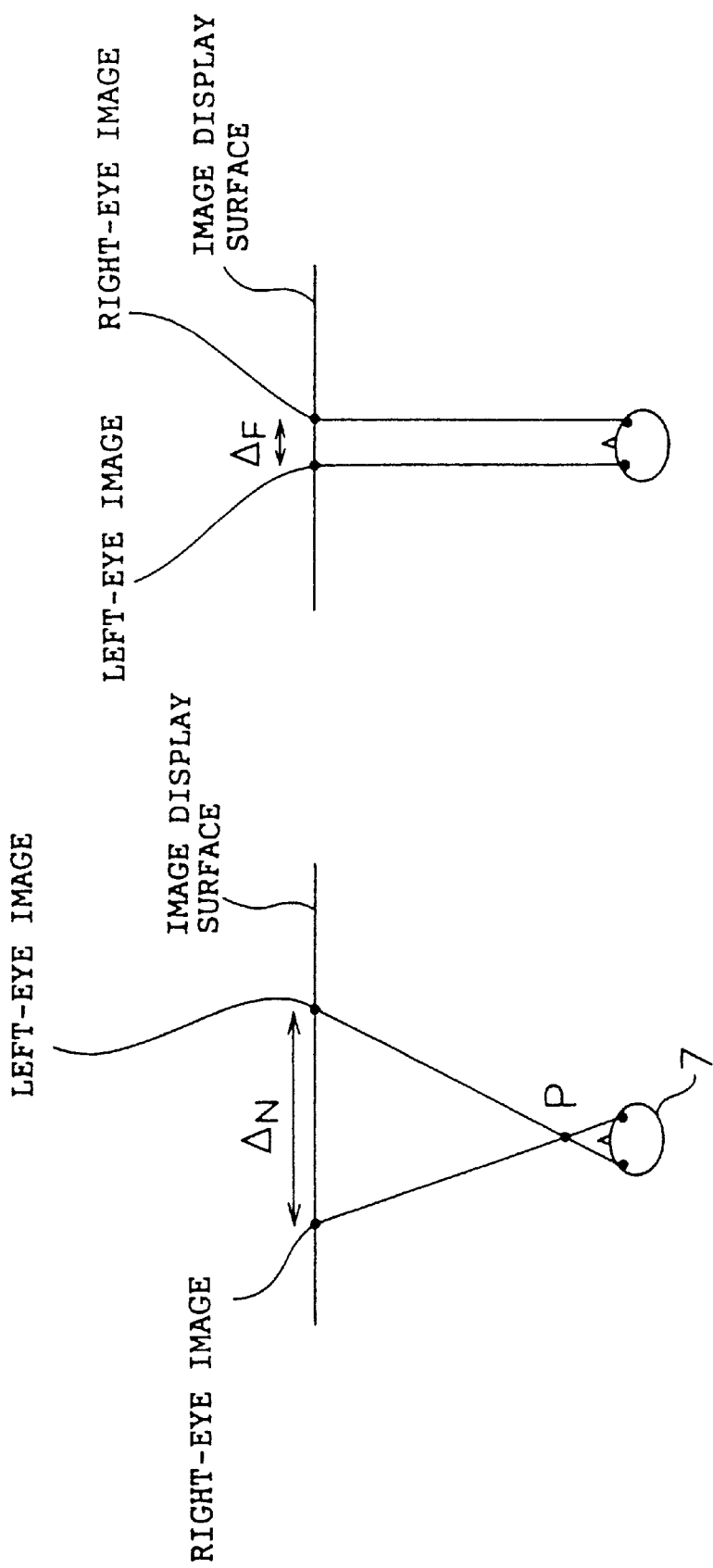
FIG. 20 is a diagram showing a viewer's binocular fusional range.

That is, the liquid-crystal shutter switching pulse generating section A17 outputs the liquid-crystal shutter control signal shown in FIG. 17, in response to which the left-eye shutter in the liquid-crystal shutter glasses A18 is opened to admit light when the right-eye shutter is closed to block light, and vice versa.

First, the right-eye image signal is input to the resolution discrimination section A9, the synchronization section A12, and the parallax calculation section A8. The resolution discrimination section A9 detects the horizontal and vertical frequencies of the input image signal and discriminates the resolution of the input image. The basic synchronization timing generating section A11 outputs synchronization timing data matching the detected horizontal and vertical frequencies of the input image, and the synchronization section A12 is synchronized to the timing of the image signal.

The parallax calculation section A8 calculates the parallax map of the input image from the right-eye and left-eye image signals input alternately by time multiplexing. The calculation of the parallax map can be made in exactly the same manner as in the sixth embodiment.

Then, the parallax calculation section A8 outputs, for example, the binocular parallax of the most distant object among the binocular parallaxes obtained at the respective points of the image. At this time, in calculating the binocular parallaxes, spatial low-pass filtering may be applied, or a plurality of extraction regions may be preset and calculations may be made using a statistical technique.

Next, based on the output of the resolution discrimination section A9, the image display size, the output of the parallax calculation section A8, and the distance between viewer and display surface, the optimum parallax determining section A10 determines the amount of horizontal translation of the left-eye and right-eye images so that the stereoscopic images displayed can be fused with both eyes.

The method of determining the translation amount is exactly the same as that described in the sixth embodiment. That is, denoting the largest binocular parallax output from the parallax calculation section A8 by $\Delta$ (dots), the horizontal dot count of the input image signal detected by the resolution discrimination section A9 by DH, the horizontal length of the display CRT A1 by L, and the viewer's viewing distance measured by the viewing distance measuring section A16 by ds, the largest parallax Dm on the screen is given by [Mathematical 10]. To make the maximum value of the binocular parallax coincide with the viewer's binocular parallel condition, the amount of horizontal translation, Dc, is given by [Mathematical 11]. However, the amount of translation, Dc, may be adjusted, as necessary, based on the result derived from this equation.

Further, in Mathematical 10, if the smallest binocular parallax (the largest parallax when displaying the object in the foreground on the screen) is set as $\Delta$, then the optimum parallax determining section A10 determines the amount of horizontal translation of the screen so that Dm becomes smaller than the viewer's largest fusional parallax (which varies depending on the screen size).

Based on the thus obtained amount of horizontal translation, Dc, the parallax control section A13 move the right-eye and left-eye images in opposite directions horizontally by Dc/2. At this time, since the left-eye and right-eye signals are input as a time-multiplexed stereoscopic image signal, the screen display is switched between the left-eye and right-eye images. Therefore, the amount of horizontal translation of the image is switched from +Dc/2 to −Dc/2 or vice versa between fields.

The image signal is then separated by the RGB separation section A14 into the R, G, and B signals, which are supplied to the CRT A1 via the CRT driving section A15. The stereoscopic images displayed on the CRT A1, alternating between the left-eye and right-eye images, are presented independently to the respective eyes of the viewer wearing the liquid-crystal shutter glasses A18.

As described above, according to the present embodiment, even when the input image signal is a time-multiplexed stereoscopic image. signal, the viewer can always view natural-looking stereoscopic images displayed with optimum binocular parallax.

(Embodiment 8)

Figure 21:
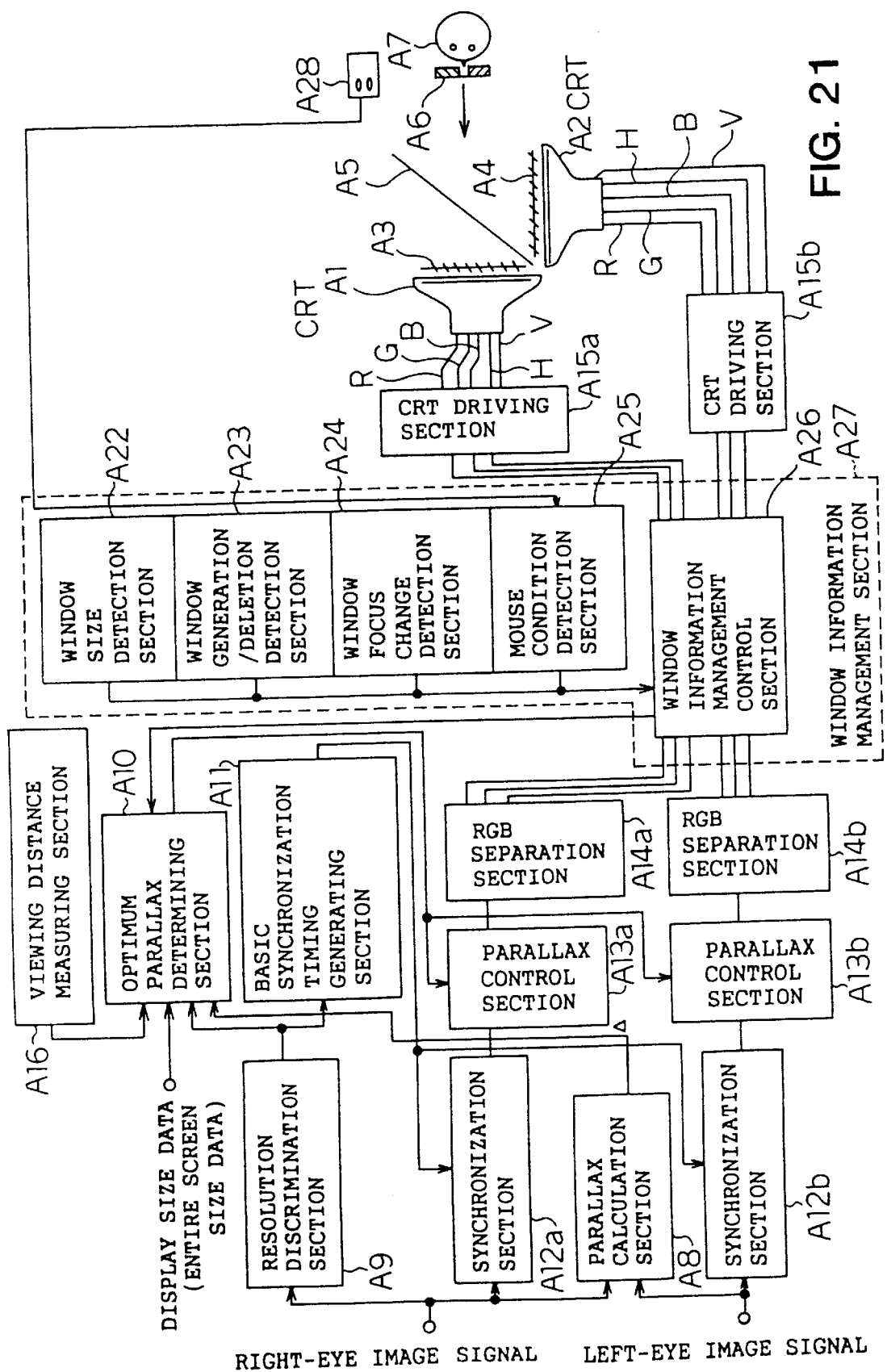
FIG. 21 is a diagram showing the configuration of a stereoscopic TV apparatus according to an eighth embodiment of the present invention.

FIG. 21 is a diagram showing the configuration of a stereoscopic TV apparatus according to an eighth embodiment of the present invention. In FIG. 21, A1 and A2 are CRTs, A3 and A4 are linear polarizers, A5 is a half-silvered mirror, A6 is a pair of glasses formed from polarizing filter, A7 is a viewer, A8 is a parallax calculation section, A9 is a resolution discrimination section, A10 is an optimum parallax determining section, A11 is a basic synchronization timing generating section, A12a and A12b are synchronization sections, A13a and A13b are parallax control sections, A14a and A14b are RGB separation sections, A15a and A15b are CRT driving sections, and A16 is a viewing distance measuring section; these sections are the same as those used in the sixth embodiment.

The difference from the sixth embodiment is the addition of the following sections: a window information management section A27, a window information management control section A26, a mouse condition detection section A25, a window size detection section A22, a window generation/deletion detection section A23, a window focus change detection section A24, and a mouse A28.

The operation of the stereoscopic TV apparatus having the above configuration will be described below.

In the sixth and seventh embodiments, the image display size was the screen size of the display apparatus itself regardless of the synchronization frequency of the input video signal. On the other hand, in the present embodiment, multiple kinds of stereoscopic images are displayed simultaneously in different windows on a computer screen in a windowing envir onment which has recently become a predominant operating enviroment. And parallax is controlled in response to such conditions that viewer changes the size of the window by using a mouse.

It is assumed here that a plurality of windows are displayed on the screen of each of the CRTs A1 and A2 of FIG. 21, and that stereoscopic images are displayed in one of the windows.

Usually, the viewer is allowed to resize each window as he desires by using the mouse A28. When the size of the stereoscopic images changes as a result of a change in window size, not only the parallax of the displayed stereoscopic images but the viewer's binocular fusional range also changes. Therefore, the window size must be monitored constantly, and the parallax must always be controlled accordingly. More specifically, information about the window operated by the viewer using the mouse is detected by the window information management control section A26.

The window information management control section A26 manages the currently displayed windows by the window generation/deletion detection section A23, and the size of each individual window is detected by the window size detection section A22. Data representing the size of the applicable window is output to the optimum parallax determining section A10.

The optimum parallax determining section A10 obtains the horizontal and vertical dot counts of the display screen and the size of each window (dot count) from the outputs of the resolution discrimination section A9 and the window size detection section A22, and based on the thus obtained information and on the information about the size of the entire image display area (CRT diagonal size in inches), calculates the size of each window actually displayed (in inches, centimeters, etc.).

The remainder of the process is the same as that described in the sixth embodiment. That is, from the right-eye and left-eye image signals, the parallax calculation section A8 calculates depth information at each point of the input image, and outputs a maximum or minimum value, for example.

Next, the optimum parallax determining section A10 obtains the actual size of the display window from the output of the resolution discrimination section A9 (the result obtained by judging the image resolution and aspect ratio based on the kind of input image signal detected), the entire image display size (in this case, CRT diagonal size expressed in inches), and the display window size (dot count) output from the window information management section A27, and determines the amount of horizontal translation of the left-eye and right-eye images so that the viewer of the stereoscopic TV can fuse the displayed stereoscopic images. This translation amount is determined, by using Mathematical 10 and Mathematical 11, on the basis of the output of the parallax calculation section A8 (the parallax map) and the distance between viewer and display surface measured by the viewing distance measuring section A16.

Based on the thus obtained amount of horizontal translation, the parallax control section A1a and A13b move the right-eye and left-eye images in opposite directions horizontally so that the displayed images will come within the viewer's binocular fusional range. Then, the image signals are separated by the RGB separation sections A14a and A14b into the R, G, and B signals, which are passed through the window information management control section A26 and are output to the CRTS A1 and A2, via the CRT driving sections A15a and A15b, for display in the designated window on the display screen.

When processing the input image signals for display in a plurality of windows of different sizes, the amount of horizontal translation described above should be calculated independently for each window. Further, when there are different image signals for display in different windows of respectively determined sizes, the processing should also be performed independently for each window.

When the viewer has changed the size of a window by using the mouse A28, the window size detection section A22 detects a change in the window size, upon which the optimum parallax determining section A10 calculates the amount of horizontal translation of the left-eye and right-eye images, and the result is immediately reflected on the display screen.

When displaying a plurality of stereoscopic images in a plurality of windows, provisions may be made so that the window specified by the user using the mouse is detected as the viewer's attention window by using the window focus change detection section A24, and the camera parameters are changed only for that window, thus controlling only the stereoscopic image displayed in the viewer's attention window within the binocular fusional range. In this way, the operational efficiency of the present invention can be enhanced.

As described above, in a display system having a windowing environment where there occur changes in window size, the stereoscopic images displayed in each individual window can be controlled within the viewer's binocular fusional range by monitoring the window size using the window information management section A27.

In the sixth, seventh, and eighth embodiments, the viewing distance was measured using the viewing distance measuring section A16, but alternatively, a fixed value may be used, such as a recommended viewing distance obtained from the CRT size.

In the sixth, seventh, and eighth embodiments, the viewing distance measuring section A16 may be constructed to measure the viewing distances for a plurality of viewers and to output the average or weighted average of the measured values or the maximum or minimum value thereof, thus performing parallax control considering the viewing distances of all the viewers involved. Further, in an environment where a plurality of viewers are viewing different windows, if binocular parallax is controlled by independently setting a viewing distance for each window, optimum stereoscopic images can be presented to each individual viewer.

In the sixth, seventh, and eighth embodiments, the optimum parallax determining section A10 calculated the largest parallax Dm on the screen by using the output of the parallax calculation section A8, the output of the resolution discrimination section A9, the horizontal length L of the display CRTs A1 and A2, and the viewer's viewing distance ds measured by the viewing distance measuring section A16. Depending on the kind of input image signal, however, the produced display may not use the entire area of the CRT screen. To address this, the resolution discrimination section A9 may be provided with a database defining relationships between the kind of input image signal (HDTV, NTSC, EDTV, computer-generated images, etc.) and display screen size, and may be constructed to be able to correctly recognize the magnitude of displayed binocular parallax according to the kind of input image signal.

In the sixth, seventh, and eighth embodiments, the parallax calculation section A8 was described as outputting the maximum value of the binocular parallax, but instead, the minimum value may be used so that the parallax of the nearest object appearing floating above the screen can be brought within the viewer's binocular fusional range. In this case, however, since the. magnitude of the allowable binocular parallax changes as a function of the viewing distance and screen size, a database defining the values of allowable binocular parallaxes. must be provided.

The sixth, seventh, and eighth embodiments have been described as using multisync monitors, but in the case of a monitor specifically designed for use with a fixed frequency image signal, the resolution discrimination section need not be provided, and a fixed value may be used in the product specification.

Further, typical screen sizes, such as ½ or ⅓ of the full screen size, may be predefined by fixed values.

In the sixth, seventh, and eighth embodiments, the parallax control section A13 may be constructed to operate whenever the amount of translation, Dc, is calculated, or to operate only at the start of the apparatus operation and when there occurs a significant change in the binocular parallax of the input image.

In the sixth, seventh, and eighth embodiments, provisions may be made so that the viewer enters adjustment commands using pushbutton switches or a remote controller only when he desires to adjust binocular parallax.

In the seventh embodiment, a time multiplexing system requiring the use of liquid-crystal shutters was used to produce a final stereoscopic image display, but it will be recognized that any other stereoscopic display method may be used, such as a parallax barrier method and a lenticular-lens method that does not require glasses.

As is apparent from the descriptions so far given, since stereoscopic images are generated, or left-eye and right-eye images are automatically moved horizontally prior to image presentation, by considering the display screen size of the stereoscopic TV apparatus, the resolution (frequency) of the input image signal, and the window size, the present invention has the advantage of being able to generate and present stereoscopic images looking natural and easy to view for the viewer.

What is claimed is:

1. A stereoscopic TV apparatus comprising:

a parallax calculation section for calculating binocular parallax from left-eye and right-eye images, and for calculating a maximum or minimum value of said binocular parallax;

a viewing distance measuring section for measuring a viewing distance of a viewer;

a resolution discrimination section for discriminating the kind of an input image signal by detecting a synchronization frequency of said input image signal;

an optimum parallax determining section for calculating the magnitude of binocular parallax of a displayed image from the output of said parallax calculation section, the output of said viewing distance measuring section, the output of said resolution discrimination section, and the size of a display screen, and for computing an amount of parallax change necessary to bring said binocular parallax within a binocular fusional range of said viewer; and a parallax control section for, in accordance with the output of said optimum parallax determining section, translating the left-eye and right-eye images in horizontal directions so that stereoscopic images will be displayed within the binocular fusional range of said viewer even if the synchronization frequency of the input image frequency changes.

2. A stereoscopic TV apparatus according to claim 1, wherein said viewing distance measuring section outputs as said viewing distance a recommended viewing distance for a stereoscopic TV.

3. A stereoscopic TV apparatus according to claim 1, wherein said viewing distance measuring section measures viewing distances of a plurality of viewers, and outputs as said viewing distance an average value or weighted average value of said measured viewing distances or a maximum or minimum value thereof.

4. A stereoscopic TV apparatus according to claim 1, wherein said parallax calculation section outputs parallax as a predetermined fixed value.

5. A stereoscopic TV apparatus according to claim 1, wherein the output of said resolution discrimination section is set as a fixed value by assuming that only one kind of image is input.

6. A stereoscopic TV apparatus according to claim 1, wherein said resolution discrimination section detects the kind of said input image signal among HDTV, EDTV and NTSC signals and computer-generated image signals of various resolutions, and identifies the resolution and aspect ratio of the detected kind of input image signal so that said optimum parallax determining section can recognize an image size which is viewed by an operator, on the display screen.

7. A stereoscopic TV apparatus according to claim 1, wherein said parallax control section translates the images in horizontal directions only when there occurs a significant change in the binocular parallax of the displayed images.

8. A stereoscopic TV apparatus according to claim 1, wherein said parallax control section translates the images in horizontal directions only when said viewer desires to adjust the binocular parallax and inputs an instruction using an instruction means such as a pushbutton switch or a remote controller.

* * * * *